(12) United States Patent
Konakawa et al.

(10) Patent No.: US 7,856,813 B2
(45) Date of Patent: Dec. 28, 2010

(54) EXHAUST SYSTEM FOR EIGHT-CYLINDER ENGINE

(75) Inventors: Tsugunori Konakawa, Shizuoka-ken (JP); Yoshihiko Atsumi, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 822 days.

(21) Appl. No.: 11/829,791

(22) Filed: Jul. 27, 2007

(65) Prior Publication Data

US 2009/0007550 A1 Jan. 8, 2009

(30) Foreign Application Priority Data

Jul. 27, 2006 (JP) ............... 2006-204699

(51) Int. Cl.
*F01N 1/00* (2006.01)
(52) U.S. Cl. ............... 60/323; 60/274; 60/324
(58) Field of Classification Search ........ 60/273, 60/274, 324, 323; 440/88 J
See application file for complete search history.

(56) References Cited

FOREIGN PATENT DOCUMENTS

JP 2000-265836 9/2000

OTHER PUBLICATIONS

U.S. Appl. No. 11/829,499, filed Jul. 27, 2007, entitled Exhaust Device for Outboard Motor.

*Primary Examiner*—Thomas E Denion
*Assistant Examiner*—Jesse Bogue
(74) *Attorney, Agent, or Firm*—Keating & Bennett, LLP

(57) ABSTRACT

An exhaust manifold includes first to eighth upstream exhaust pipes extending respectively from first to eighth cylinders ignited in that order; first to fourth midway exhaust pipes extending respectively from a joint of extended ends of the first and fifth upstream exhaust pipes, a joint of extended ends of the second and sixth upstream exhaust pipes, a joint of extended ends of the third and seventh upstream exhaust pipes, and a joint of extended ends of the fourth and eighth upstream exhaust pipes; and first and second downstream exhaust pipes extending respectively from a joint of extended ends of the first and third midway exhaust pipes and a joint of extended ends of the second and fourth midway exhaust pipes for communicating the respective joints to the ambient atmosphere.

16 Claims, 19 Drawing Sheets

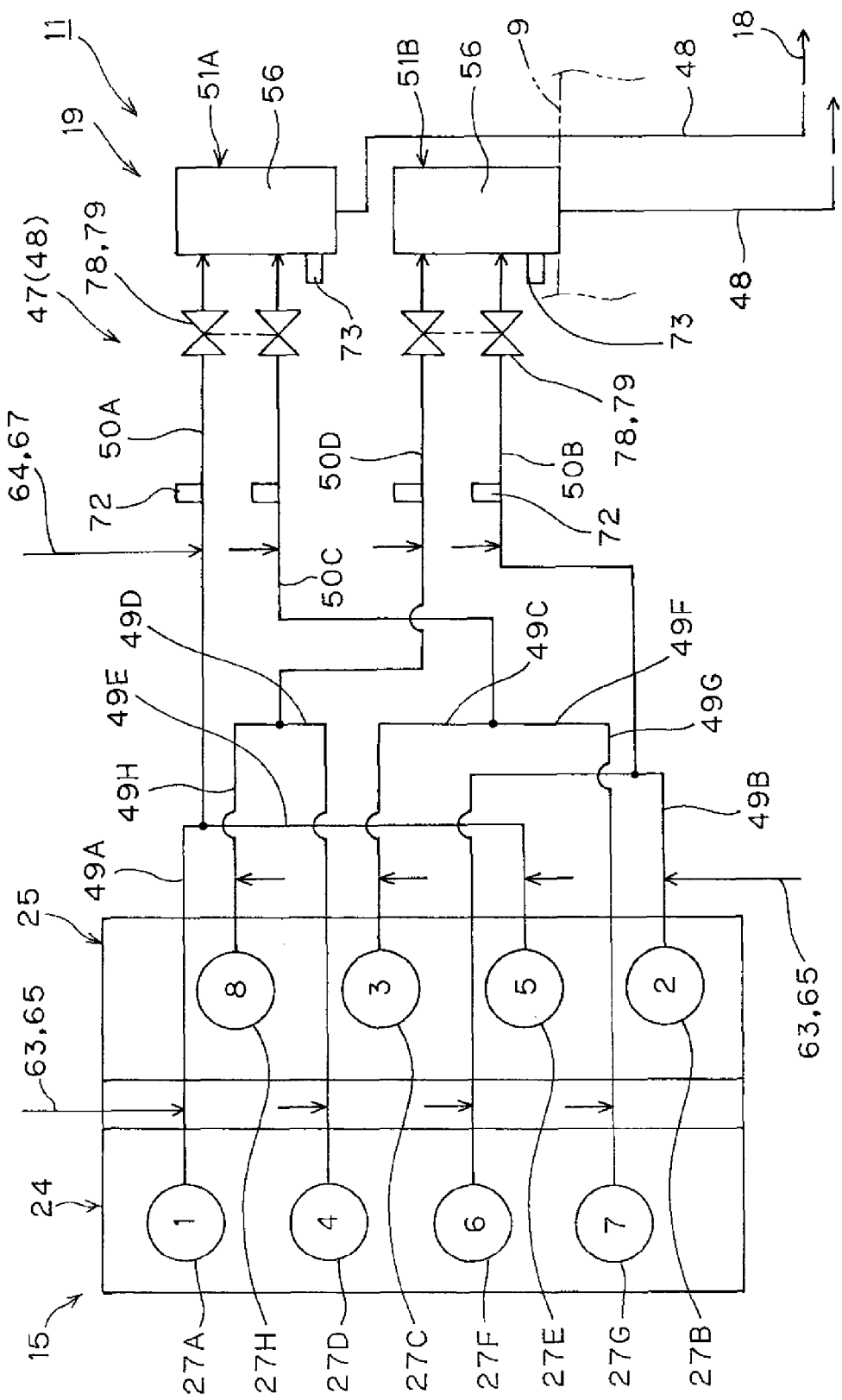
[FIG. 1]

[FIG. 2]
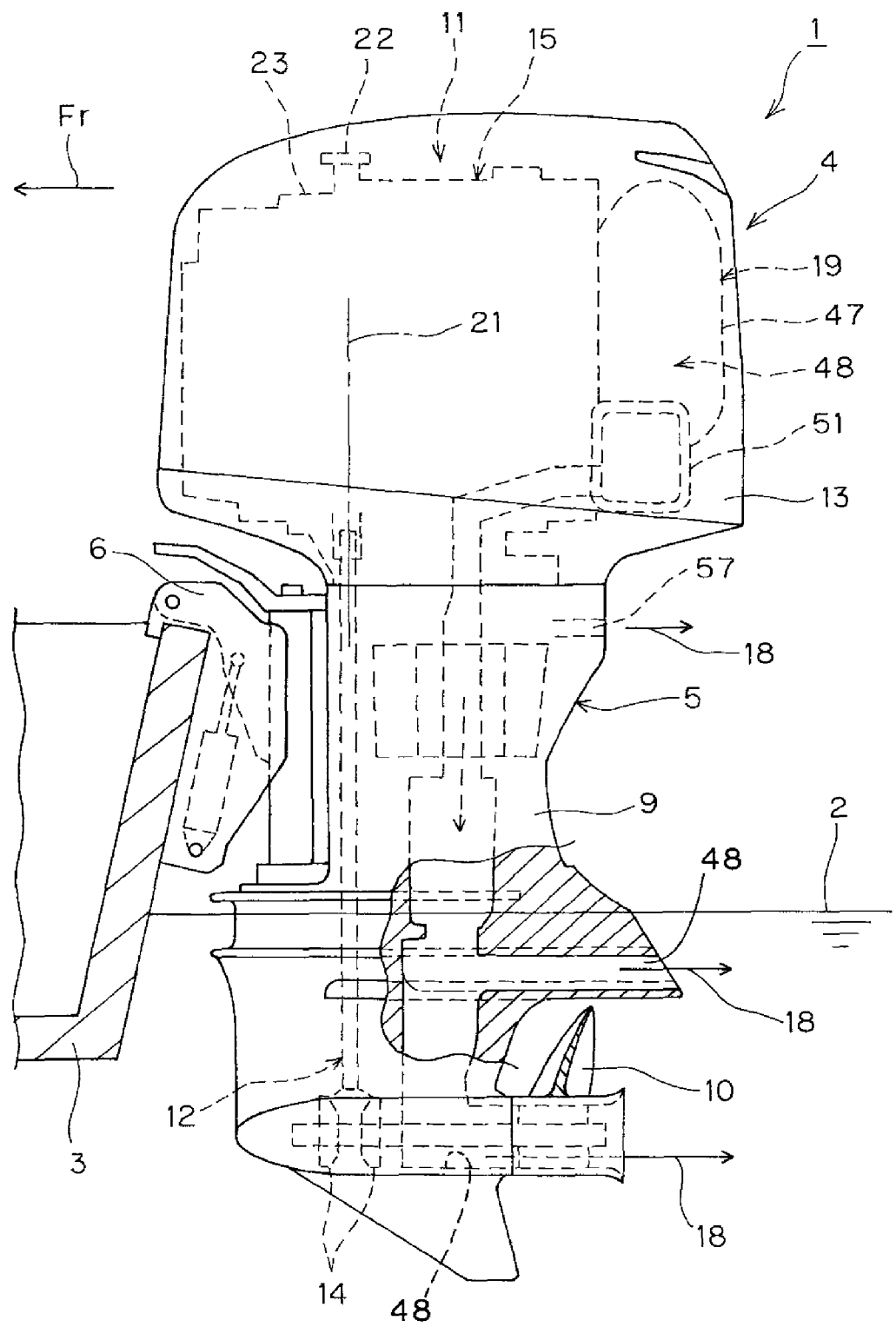

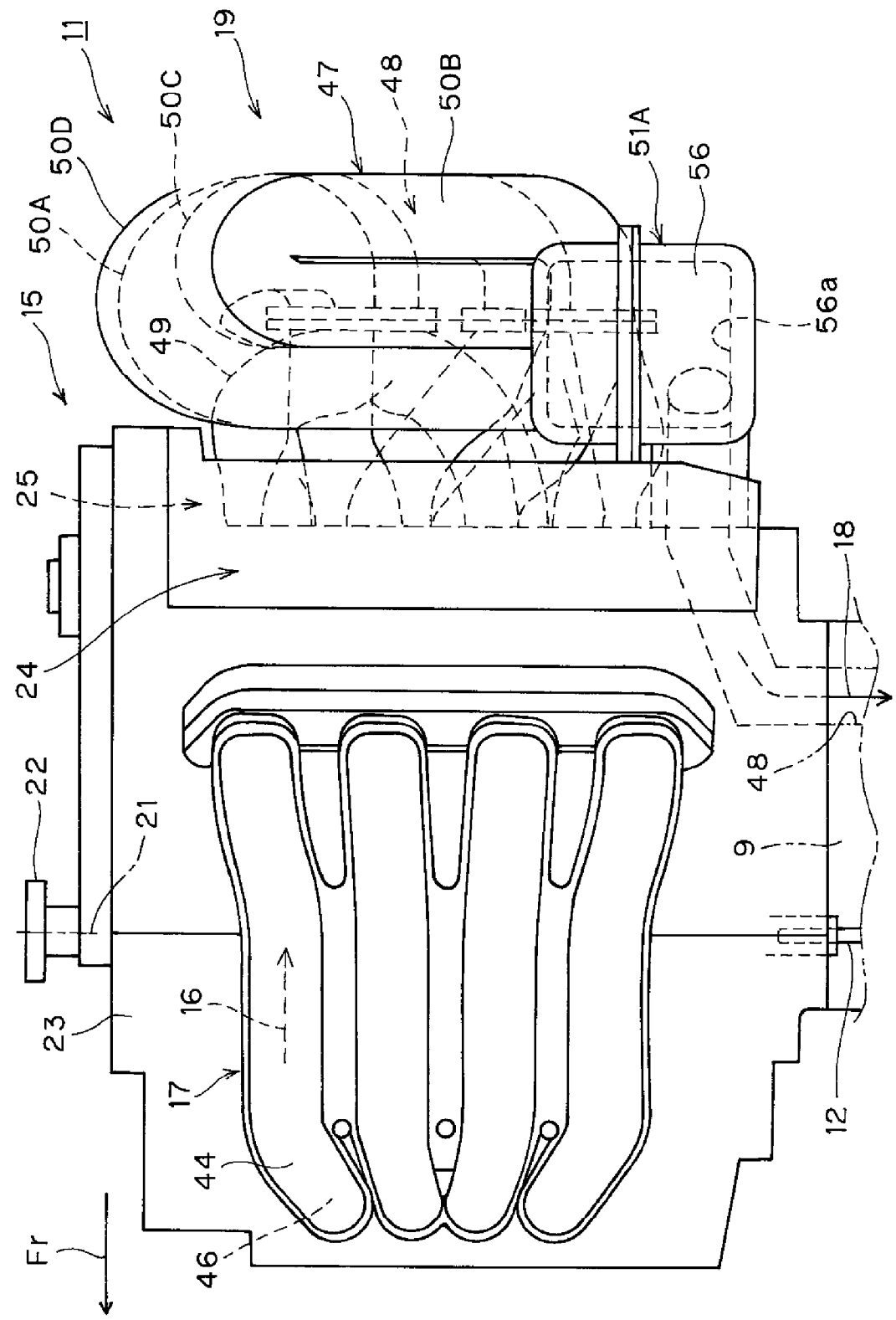
[FIG. 3]

[FIG. 4]
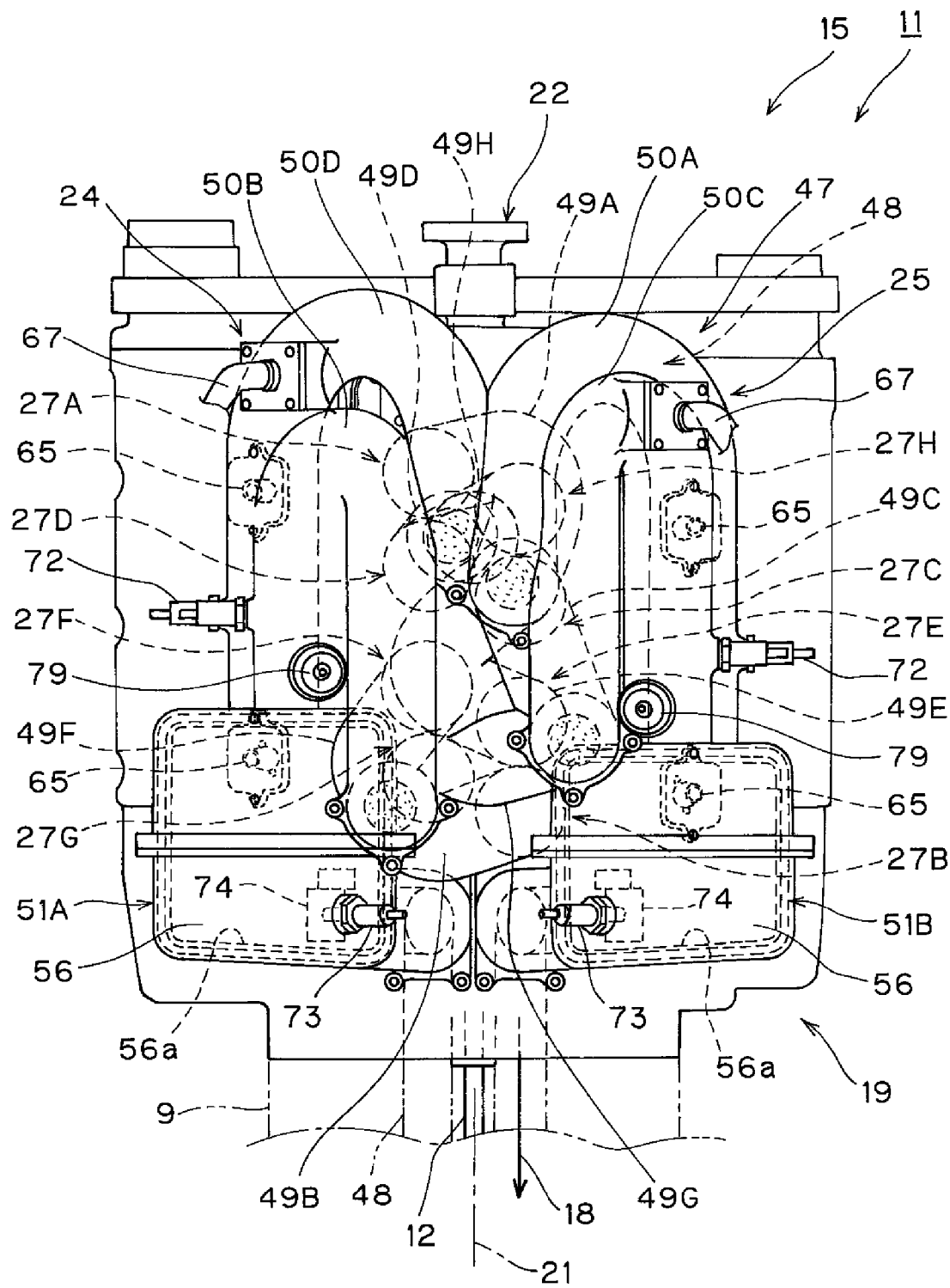

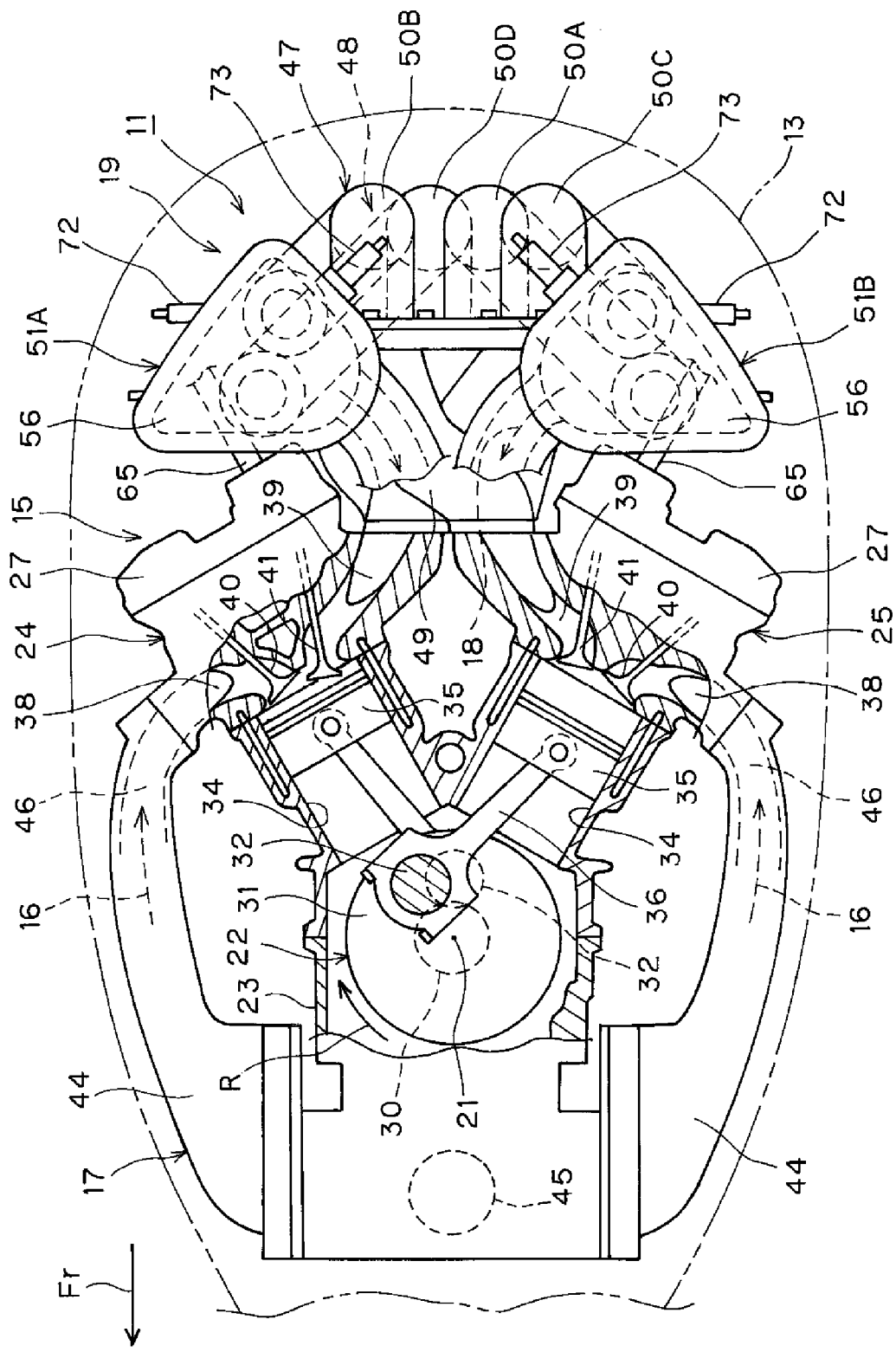
[FIG. 5]

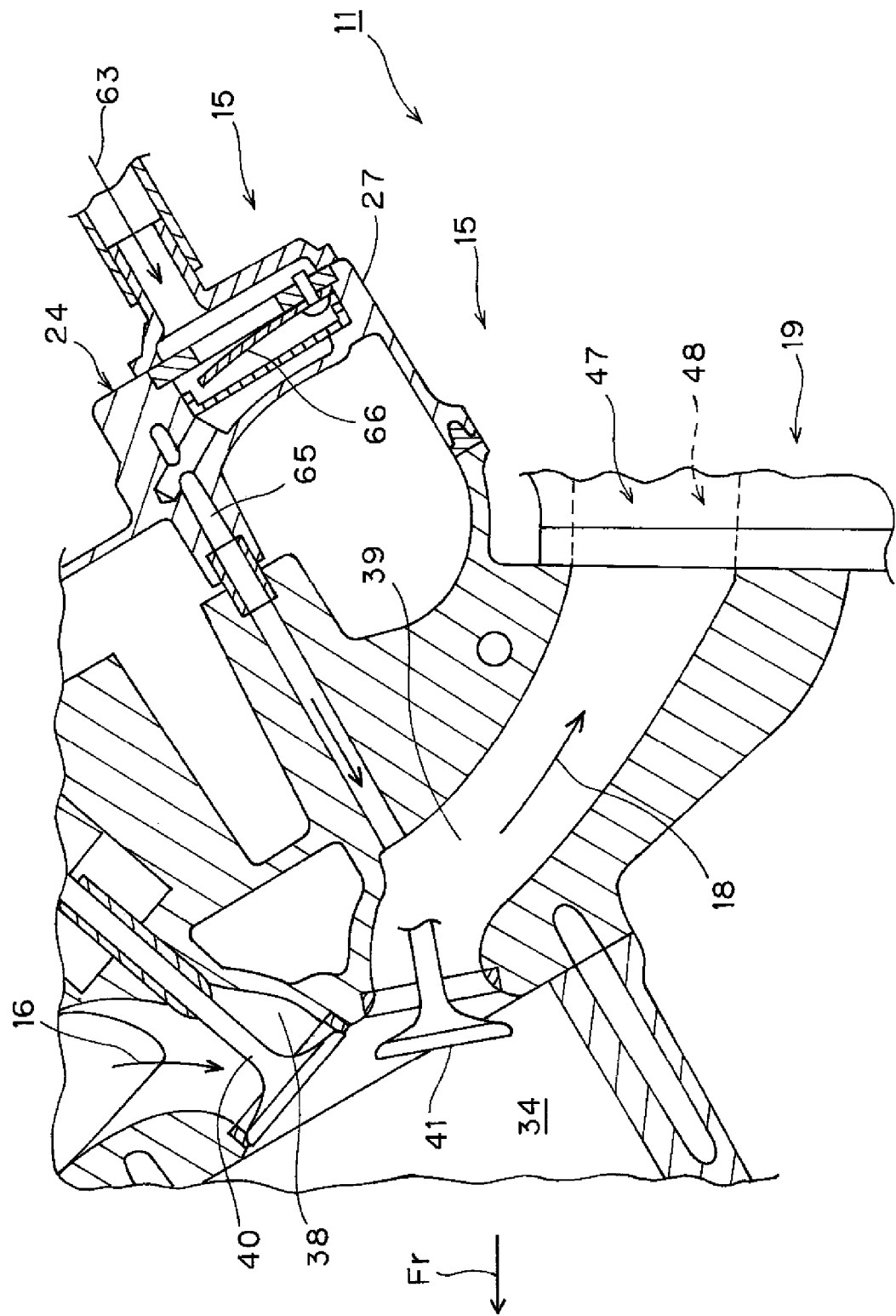
[FIG. 6]

[FIG. 7]
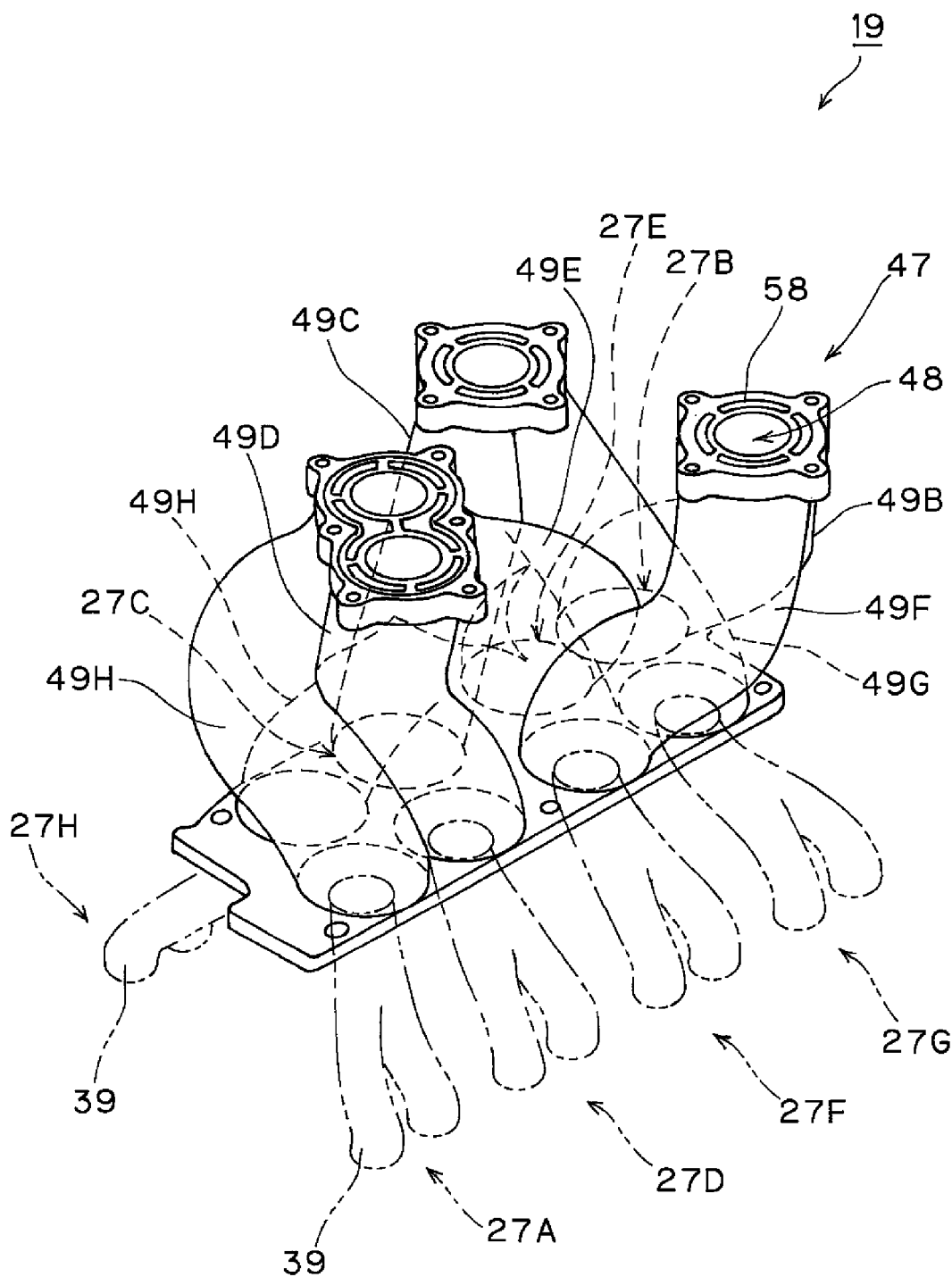

[FIG. 8]
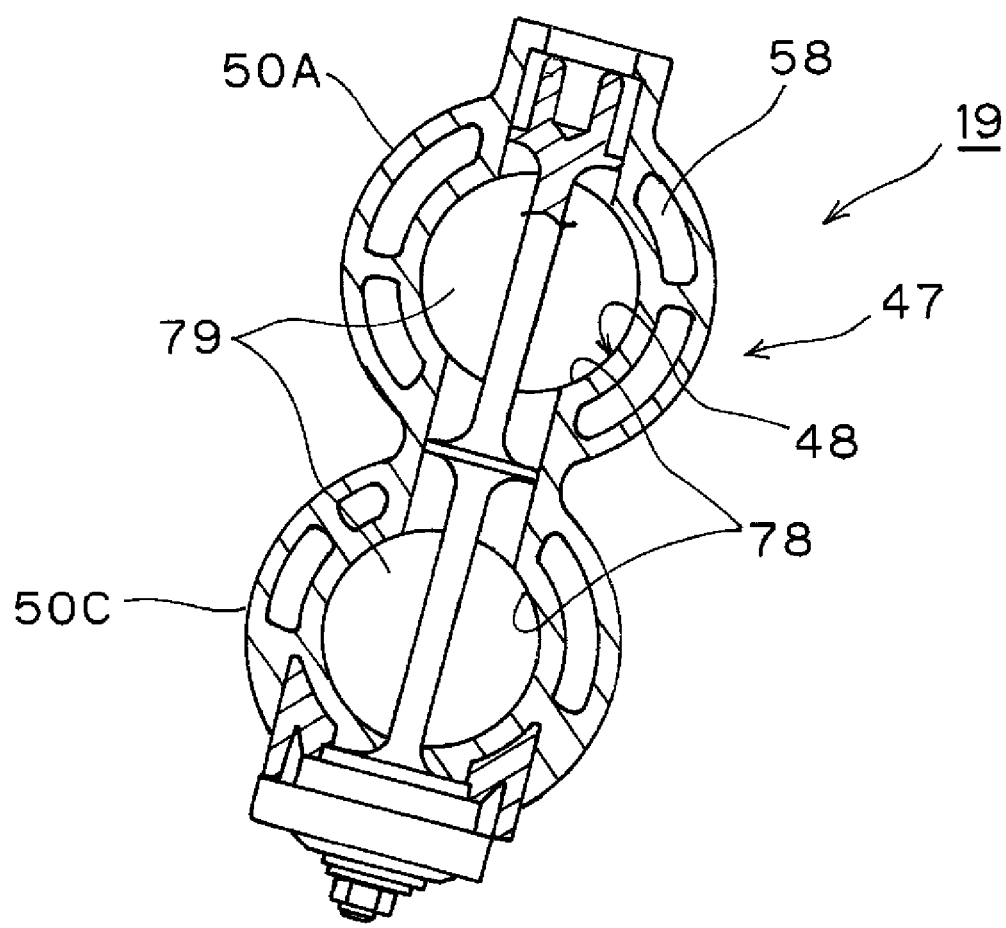

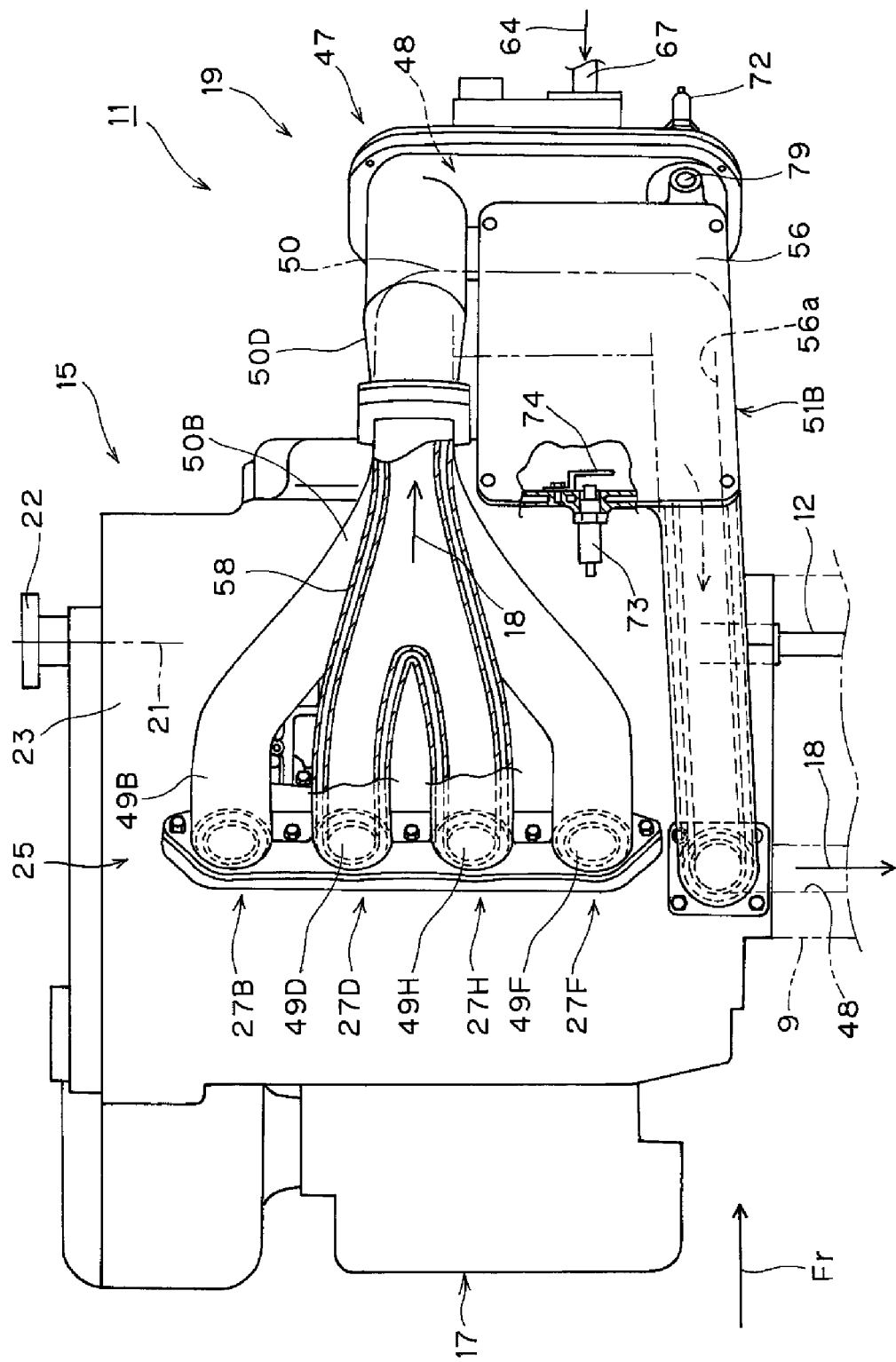
[FIG. 9]

[FIG. 10]
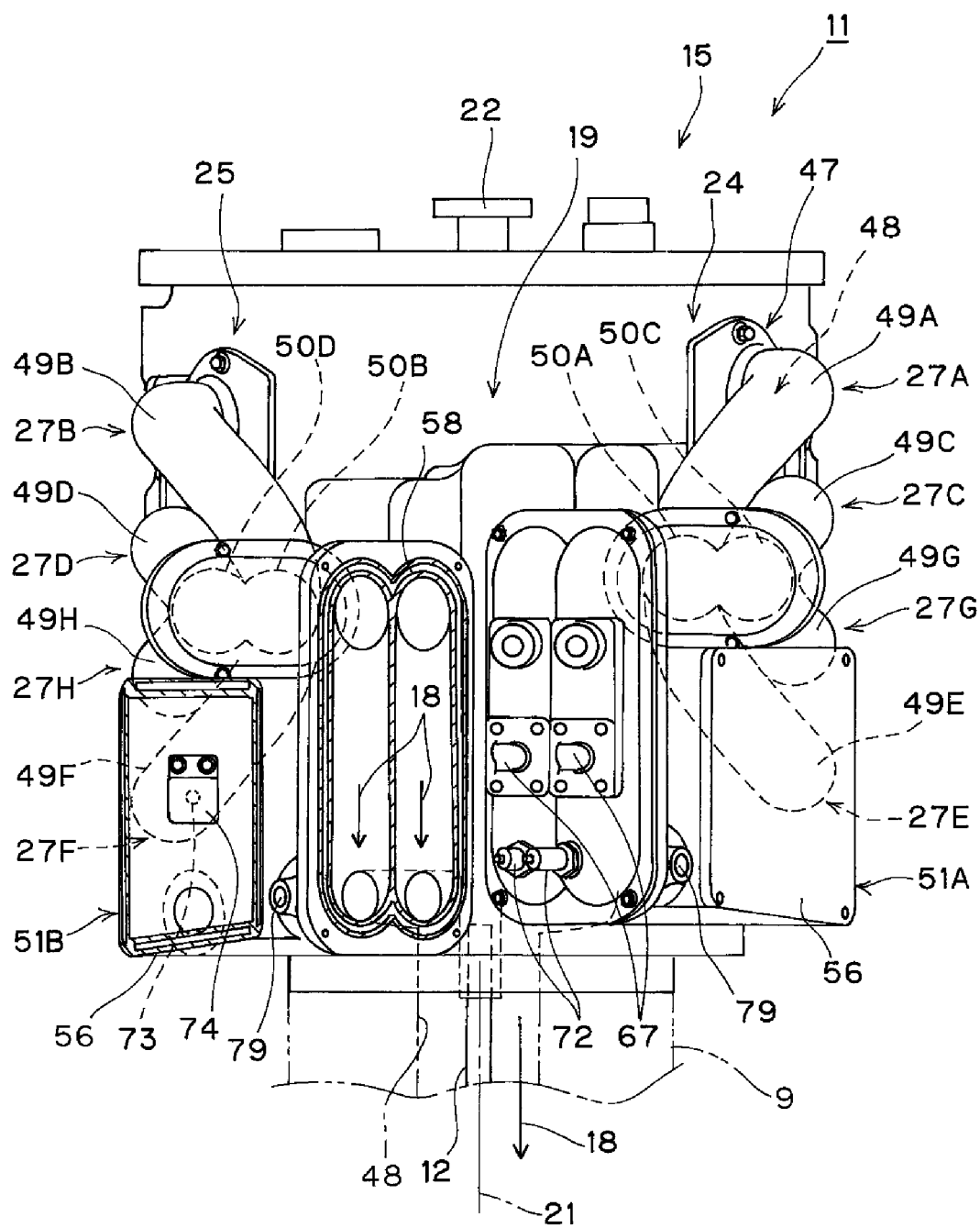

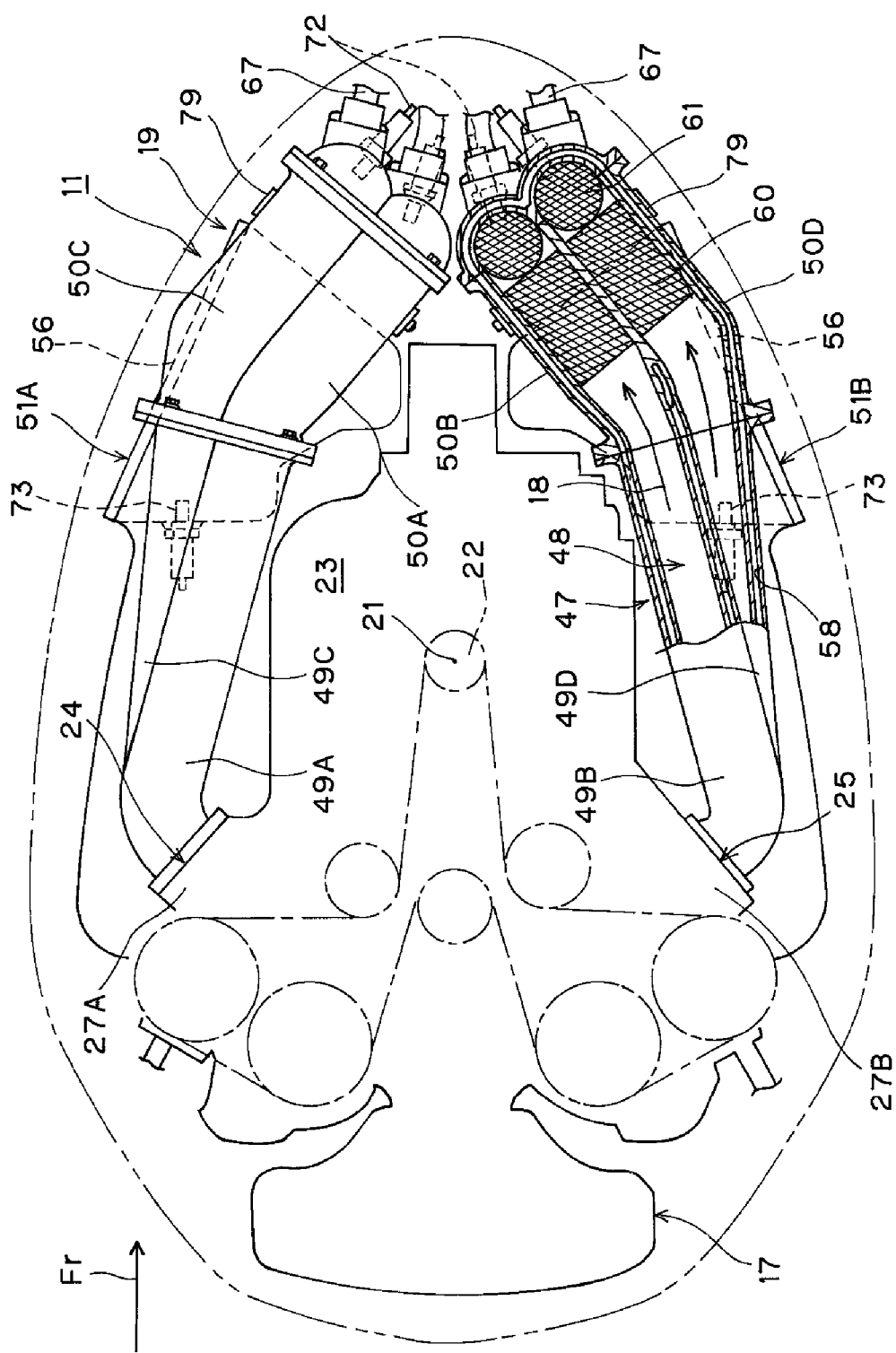

[FIG. 12]
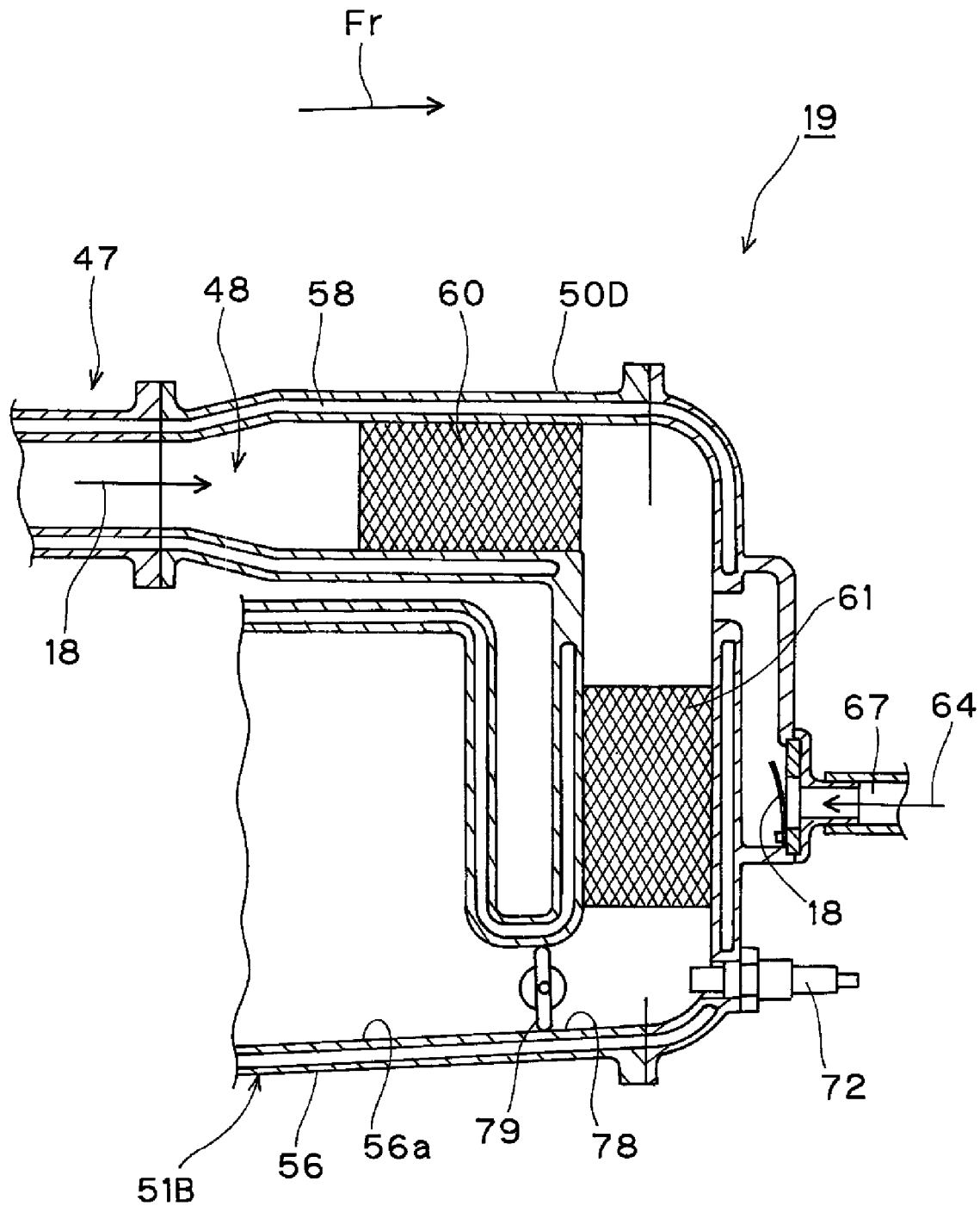

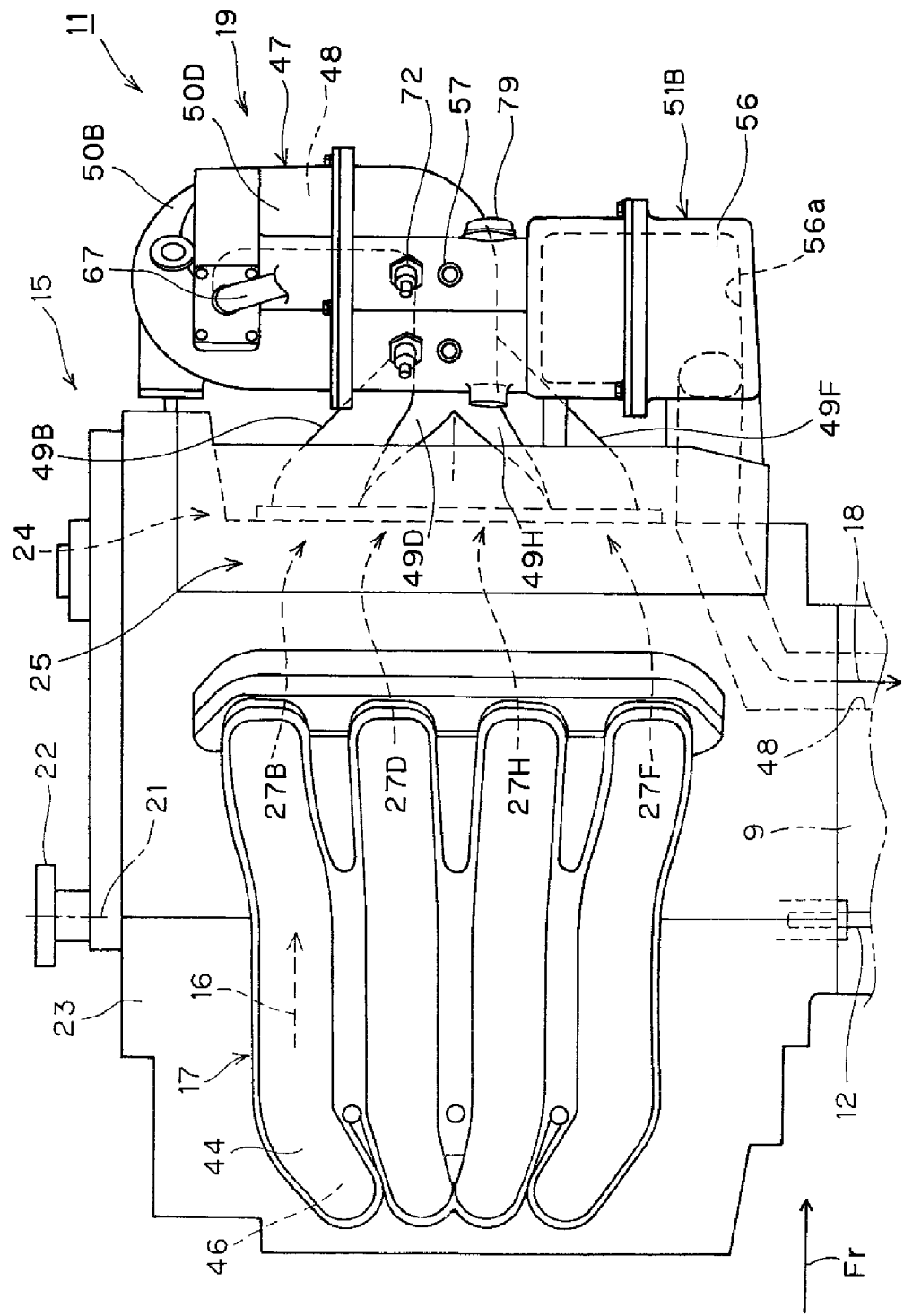
[FIG. 13]

[FIG. 14]
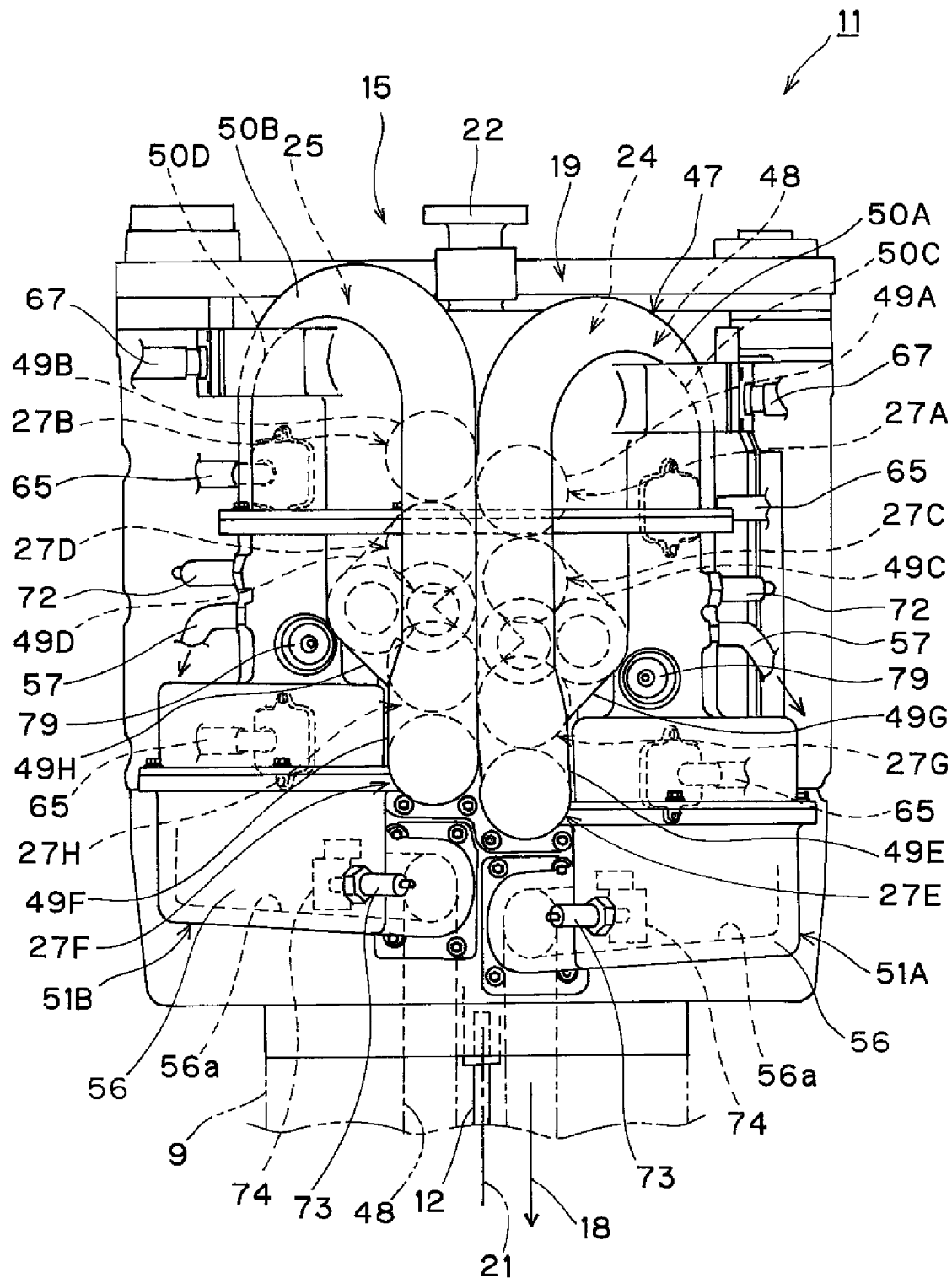

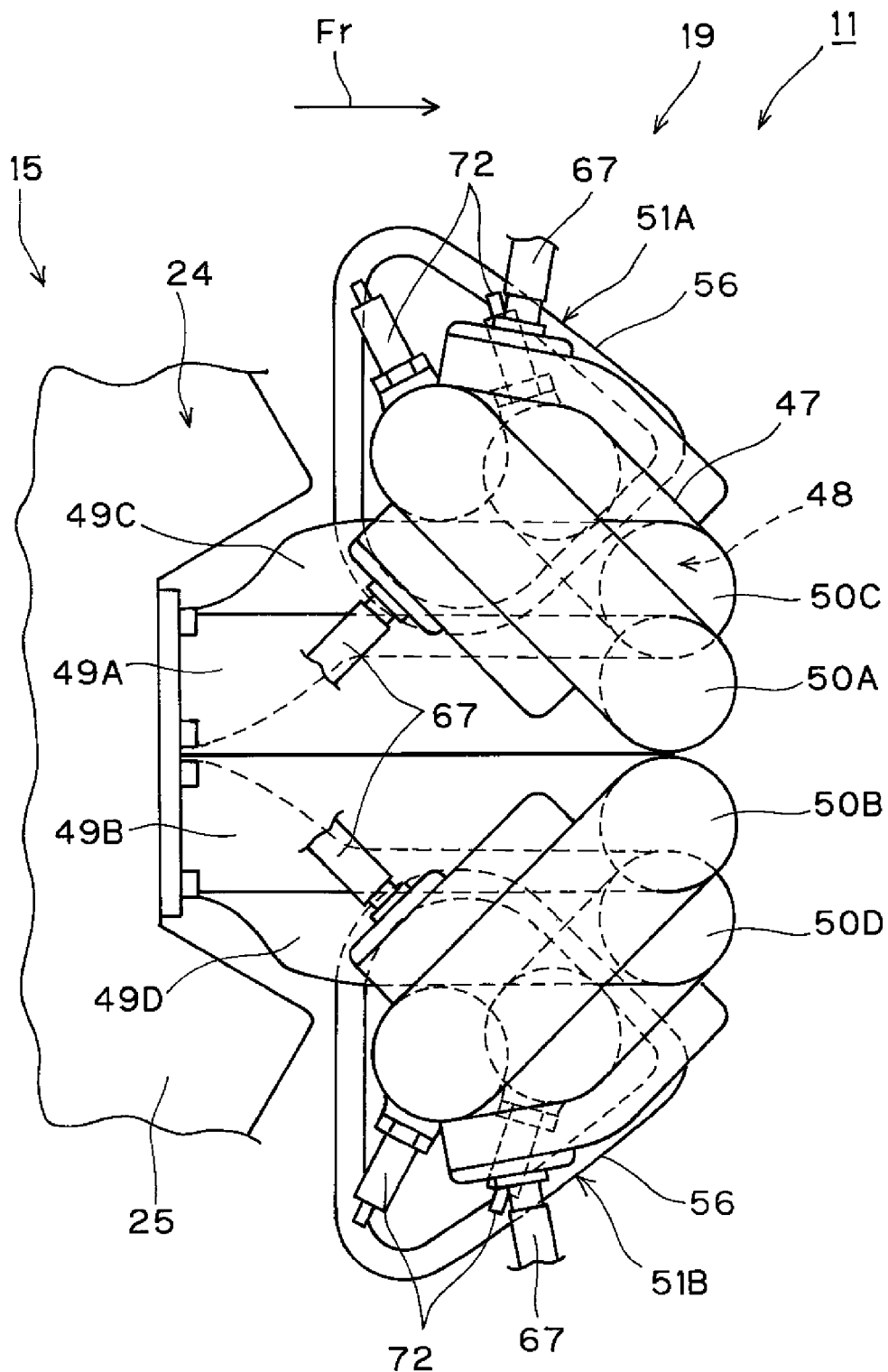
[FIG. 15]

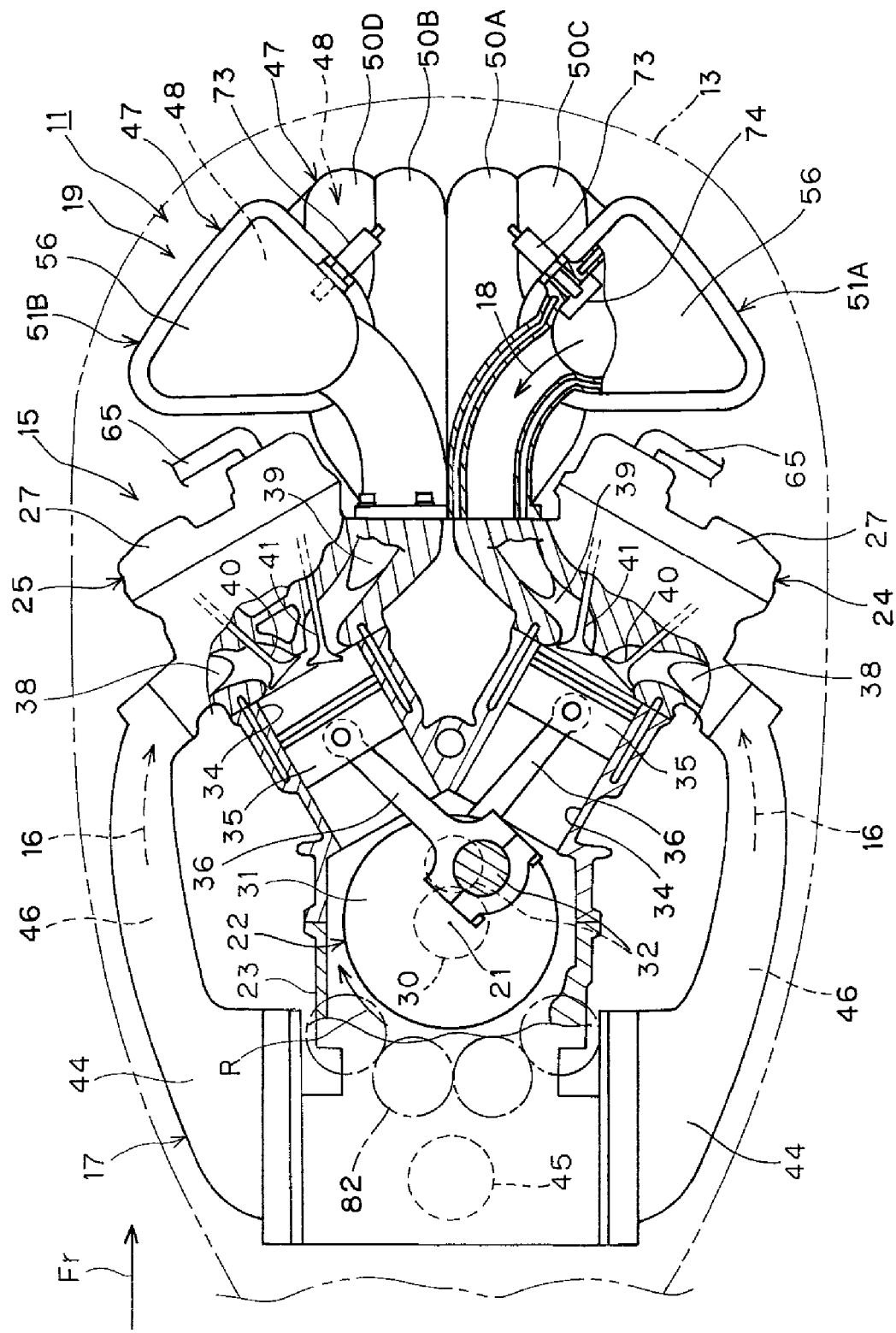
[FIG. 16]

[FIG. 17]
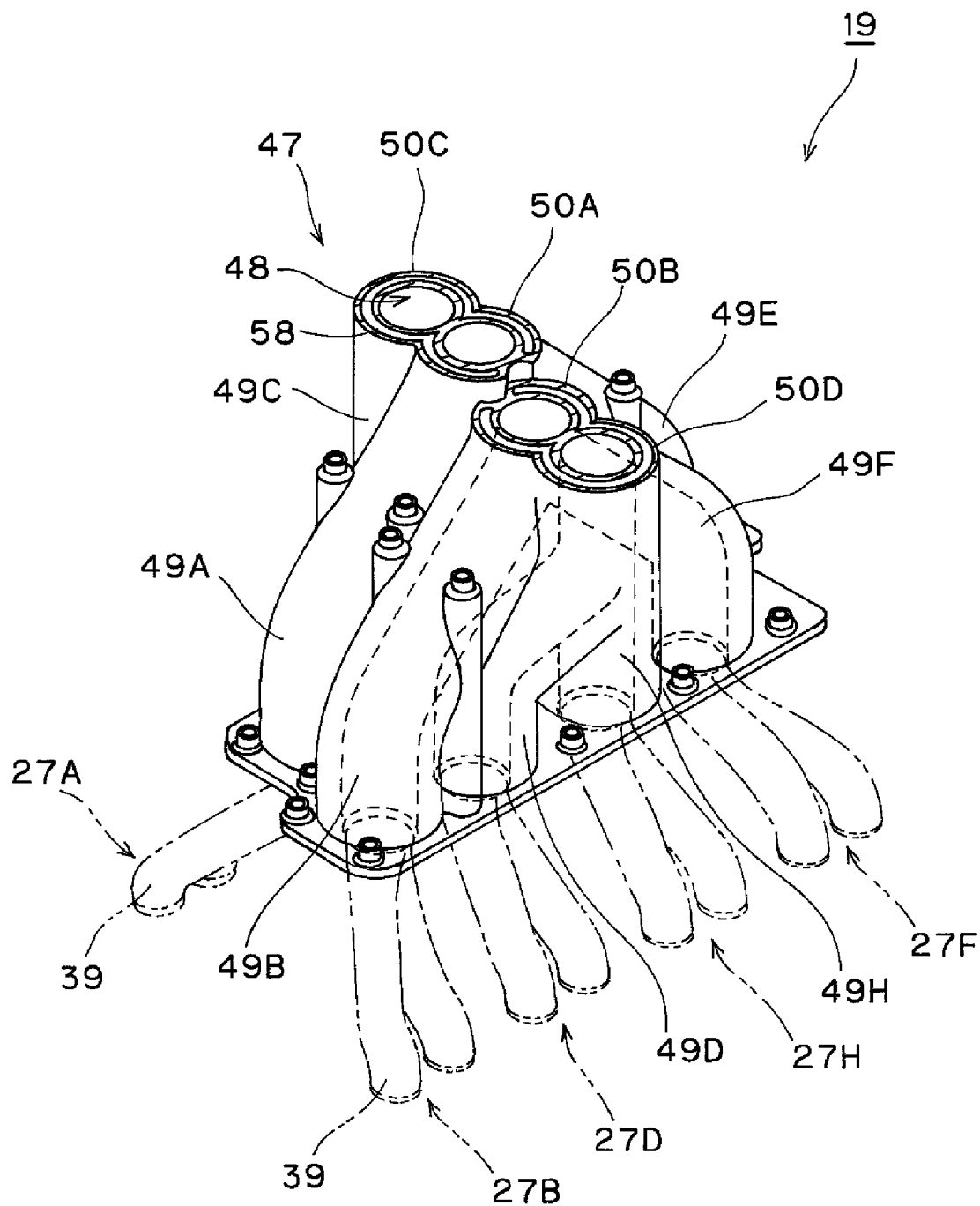

[FIG. 18]
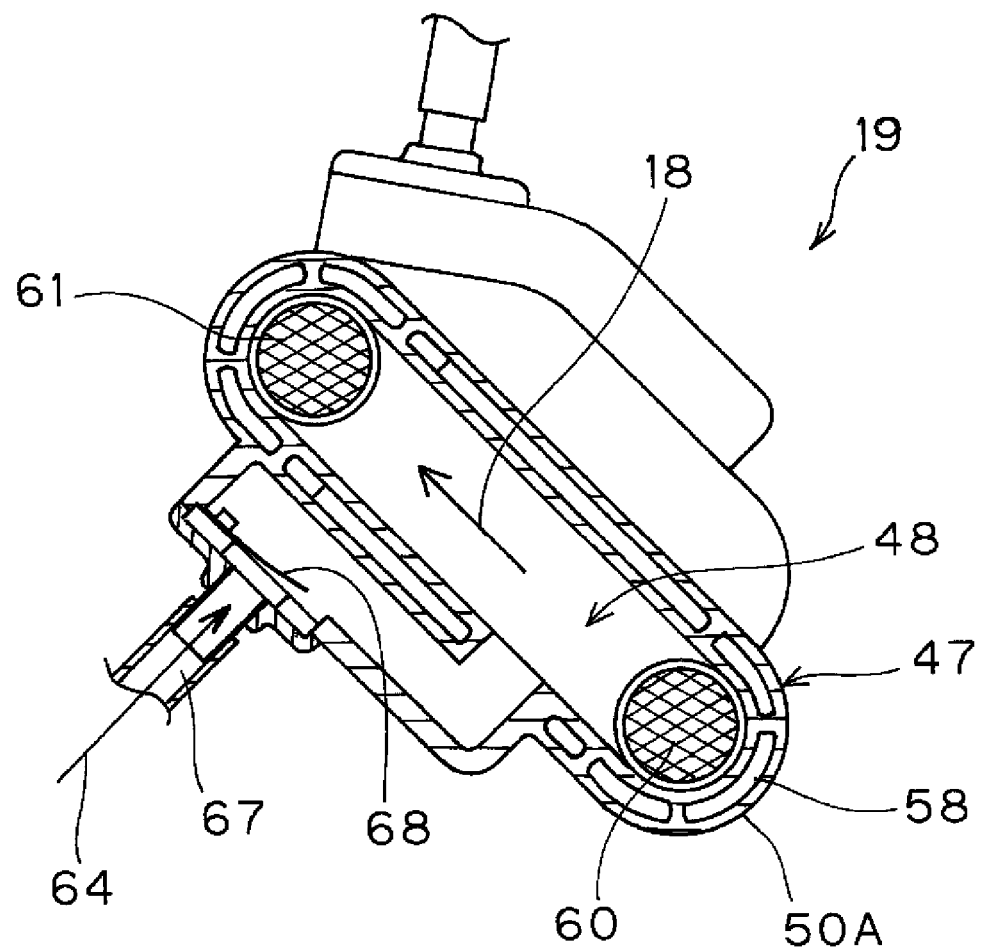

[FIG. 19]
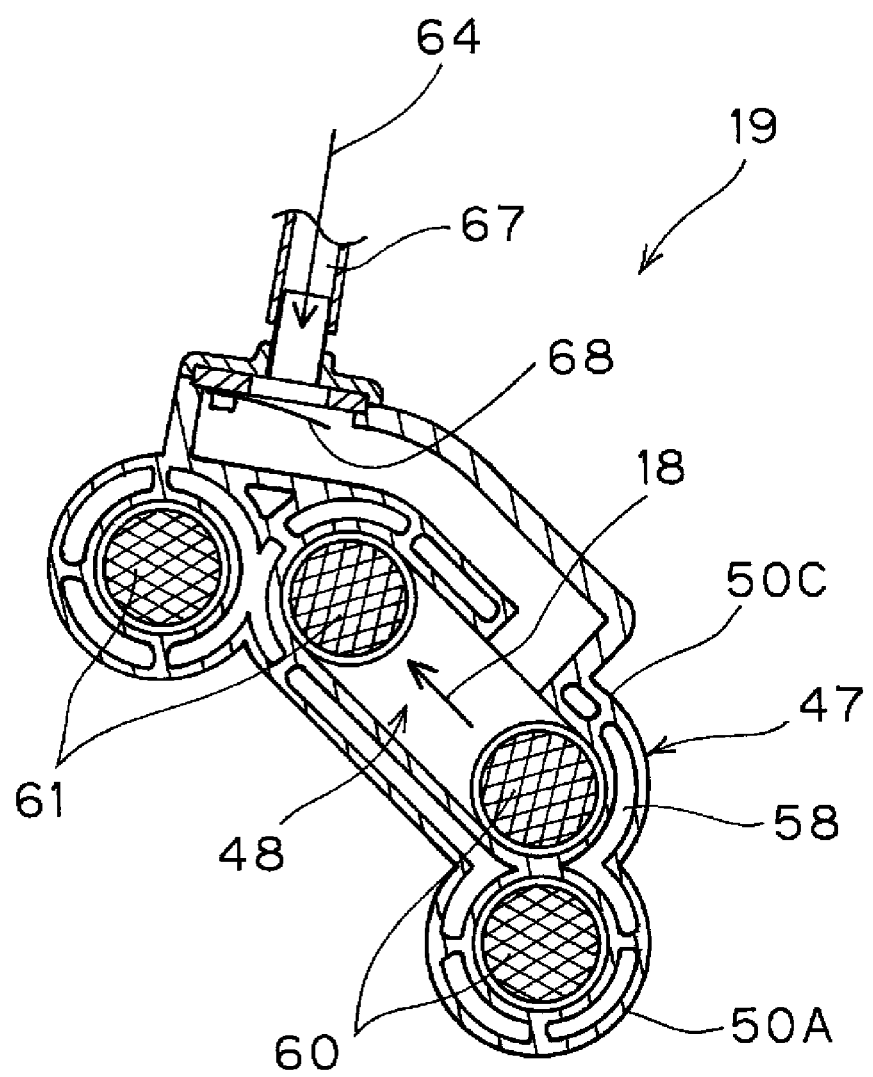

EXHAUST SYSTEM FOR EIGHT-CYLINDER ENGINE

CROSS-REFERENCE TO RELATED APPLICATIONS

The present application is based on and claims priority under 35 U.S.C. §119 to Japanese Patent Application Serial No. 2006-204699, filed on Jul. 27, 2006, the entire contents of which are expressly incorporated by reference herein.

BACKGROUND OF THE INVENTION

1. Field of the Invention

The present invention relates to an exhaust device of an eight-cylinder engine.

2. Description of the Related Art

One conventional exhaust device of a multicylinder engine is disclosed in Japanese Patent Document JP-A-2000-265836, in which one set of exhaust passages extends respectively from a plurality of cylinders subjected to odd-numbered explosions and another set of exhaust passages extends respectively from a plurality of cylinders subjected to even-numbered explosions. These passages are joined individually at one point, and further joined at another point into one exhaust passage. With this structure, exhausts from the cylinders subjected to explosion in serial order are less likely to directly interfering with each other.

However, if, as in the above document, the engine is used as a drive source for an outboard motor, the length of the exhaust passages may be shortened to make the overall engine more compact. In such a case, cylinders subjected to odd-numbered explosions, which occur prior, and the cylinders subjected to even-numbered explosions, which occur later and subsequently to the former, are positioned in proximity to each other because of the length of the shortened exhaust passages described above.

As a result, exhausts from the cylinders subjected to later explosions tend to interfere with exhausts from the cylinders subjected to prior explosions. Such interference tends to decrease the intensity of desired exhaust pulses that generate negative pressure, and sufficient negative pressure may not be obtained.

When the negative pressure of exhaust pulses is not sufficiently high, the exhaust is released very effectively from the cylinders. This can cause knocking due to the burnt gas left in the cylinders, misfiring, increased pumping losses, and decreased volumetric efficiency due to an improper intake of fresh air. As a result, engine output, fuel economy and exhaust efficiency may decrease.

SUMMARY OF THE INVENTION

Accordingly, there is a need in the art for an exhaust device of an eight-cylinder engine that can prevent or minimize mutual interference of exhausts from respective cylinders, thereby providing enhanced performance of the engine.

In accordance with one embodiment, the present invention provides an exhaust device of an eight-cylinder engine that has first through eighth cylinders ignited in that order, each cylinder having an exhaust port. An exhaust manifold communicates with the exhaust ports of the first to eighth cylinders. The exhaust manifold comprises first through eighth upstream exhaust pipes extending respectively from the exhaust ports of the first through eighth cylinders. The exhaust manifold also has first through fourth midway exhaust pipes extending respectively from a joint of downstream ends of the first and fifth upstream exhaust pipes, a joint of downstream ends of the second and sixth upstream exhaust pipes, a joint of downstream ends of the third and seventh exhaust pipes, and a joint of downstream ends of the fourth and eighth upstream exhaust pipes. First and second downstream exhaust pipes extend respectively from a joint of downstream ends of the first and third midway exhaust pipes and a joint of downstream ends of the second and fourth midway exhaust pipes for communicating the respective joints to the ambient atmosphere.

In such an embodiment, exhaust from the first cylinder, for example, flows sequentially through the first upstream exhaust pipe, the first midway exhaust pipe and the first downstream exhaust pipe to the ambient atmosphere. Next, an exhaust from the second cylinder flows sequentially through the second upstream exhaust pipe, the second midway exhaust pipe and the second downstream exhaust pipe to the ambient atmosphere. Next, an exhaust is discharged from the third cylinder. This exhaust will be discussed in greater detail below. Next, an exhaust from the fourth cylinder flows sequentially through the fourth upstream exhaust pipe, the fourth midway exhaust pipe and the second downstream exhaust pipe to the ambient atmosphere. Thus, the subsequent exhausts from the second cylinder and the fourth cylinder are prevented from interfering with the exhaust from the first cylinder in the upstream exhaust pipes, the midway exhaust pipes and the downstream exhaust pipes.

The exhaust discharged from the third cylinder described above flows sequentially through the third upstream exhaust pipe, the third midway exhaust pipe and the first downstream exhaust pipe to the ambient atmosphere. Thus, both the exhaust from the first cylinder and the exhaust from the third cylinder flow through the first downstream exhaust pipe. Accordingly, the exhaust from the third cylinder may interfere with the exhaust from the first cylinder in the first downstream exhaust pipe.

Advantageously, the first upstream exhaust pipe and the first midway exhaust pipe, through which the exhaust from the first cylinder flows, and the third upstream exhaust pipe and the third midway exhaust pipe, through which the exhaust from the third cylinder flows, are separate from each other and have a relatively long length. For this reason, the first and third cylinders are far away from each other because of the exhaust passage. Thus, the exhaust from the third cylinder is prevented from interfering with the exhaust from the first cylinder in the first downstream exhaust pipe.

In some embodiments the first cylinder and the fifth cylinder are positioned in proximity to each other because the first and fifth upstream exhaust pipes, extending from the first cylinder and the fifth cylinder, are joined to each other. However, the ignition interval between the first cylinder and the fifth cylinder is significantly long due to ignitions of the second to fourth cylinders occurring therebetween. As a result, overlapping of the exhaust periods of the first cylinder and the fifth cylinder is prevented. Thus, the exhaust from the fifth cylinder is prevented from interfering with the exhaust from the first cylinder in the first and fifth upstream exhaust pipes.

The interval between ignition of the first cylinder and ignitions of the sixth to eighth cylinders is even longer. As such, the exhausts from the sixth to eighth cylinders have minimal or no interference with the exhaust from the first cylinder.

In a preferred embodiment, the same description as made to the exhaust from the first cylinder can be applied to the exhausts from the cylinders other than the first cylinder. As such, interference of the exhausts in the engine is prevented or minimized, and thus desired exhaust pulses having a sufficiently high negative pressure are obtained. Therefore, enhanced performance of the engine is achieved.

Of the exhausts from the first to eighth cylinders, the following are more likely to interfere with each other: the exhausts from the first and fifth cylinders in the first and fifth upstream exhaust pipes joined to each other; the exhausts from the second and sixth cylinders in the second and sixth upstream exhaust pipes; the exhausts from the third and seventh cylinders in the third and seventh upstream exhaust pipes; and the exhausts from the fourth and eighth cylinders in the fourth and eighth upstream exhaust pipes.

Therefore, in some embodiments, the first and fifth upstream exhaust pipes, for example, in which interference of exhausts is more likely to occur, have approximately the same equivalent length. As such, interference of an exhaust from the first cylinder with an exhaust from the fifth cylinder ignited fourth after the first cylinder and interference of the exhaust from the fifth cylinder with an exhaust from the first cylinder ignited fourth after the fifth cylinder can be set to about the same level. That is, interference between the exhausts from the first and fifth cylinders for example can be minimized and more balanced. This ensures the excellent and stable performance of the engine.

As such, in another preferred embodiment, each pair of the first and fifth upstream exhaust pipes, the second and sixth upstream exhaust pipes, the third and seventh upstream exhaust pipes, and the fourth and eighth upstream exhaust pipes have approximately the same equivalent length.

Another embodiment additionally comprises a catalyst disposed in an exhaust passage in the exhaust manifold for purifying exhaust, and an air passage for supplying secondary air to the upstream side of the catalyst in the exhaust passage.

As described above, since exhaust pulses having a sufficiently high negative pressure are obtained, secondary air can be sucked more smoothly into the exhaust passage due to the negative pressure. That is, a larger amount of secondary air can be supplied into the exhaust passage. Thus, even when the air-fuel ratio (A/F) of the mixture to be supplied to the engine is small (rich), the exhaust air-fuel ratio on the upstream side of the catalyst can be set to a desired value such as a theoretical air-fuel ratio. More reliable purification of exhaust is thereby achieved. That is, as a result of such purification of exhaust, the enhanced performance of the engine is achieved more reliably.

In yet another embodiment, the catalyst has a longitudinal length longer than a radial length in the exhaust passage.

When an engine is incorporated in an outboard motor for example, compared to the case where it is incorporated in a commercially available automobile, the engine is often operated at a maximum output point under full load. As a result, the flow speed of exhaust in the exhaust passage becomes relatively high. Thus, in some embodiments the catalyst has a longer length. This ensures that the exhaust is exposed to the catalyst more sufficiently. As a result, more reliable purification of the exhaust is achieved, thus enhancing engine performance.

In another embodiment, the engine is used as a drive source for an outboard motor, and the exhaust device further comprises an idling exhaust passage for communicating a midway part of the exhaust passage in the exhaust manifold to the ambient atmosphere above the surface of water, and a regulating part for varying the opening of a part of the exhaust passage on the downstream side of the midway part of the exhaust passage.

As a result, proper adjustment of the opening of the regulating part according to the operating state of the engine allows the pressure of the exhaust flowing through the midway exhaust pipe to be reversed by the regulating part so that exhaust pulses having a desired negative pressure can be obtained at desired timing, thus enhancing engine performance.

Also, when the hull is driven rearward by the outboard motor for example, the water may flow back through the exhaust passage and enter the idling exhaust passage, due to the dynamic pressure of the water. In this case, since both exhaust passages are obstructed, the engine may lose speed or stop.

Thus, when backflow of the water through the exhaust passage is expected such as when the hull is driven rearward, if automatic control, manual operation or the like is performed to decrease the opening of the regulating part, the entry of the water into the idling exhaust passage is prevented by the regulating part. Thus, the flow of exhaust at least through the idling exhaust passage is ensured. As a result, the engine is prevented from losing speed or stopping due to backflow of the water through the exhaust passage. Advantageously, the operation of the engine can be continued.

In accordance with another embodiment, the present invention provides an outboard motor comprising a cowling generally enclosing an engine. The engine has first through eighth combustion chambers adapted to be ignited in that order, each combustion chamber having an exhaust port. The engine additionally comprises an exhaust manifold communicating with the exhaust ports. The exhaust manifold comprises first through eighth upstream exhaust passages each having an upstream end communicating with the exhaust ports of the first through eight combustion chambers, respectively. Downstream ends of the first and fifth upstream passages connect at a first upstream joint, downstream ends of the second and sixth upstream passages connect at a second upstream joint, downstream ends of the third and seventh upstream passages connect at a third upstream joint, and downstream ends of the fourth and eighth upstream passages connect at a fourth upstream joint. First through fourth midway exhaust passages extend respectively from the first through fourth upstream joints, respectively. Downstream ends of the first and third midway exhaust passages connect at a first midway joint, downstream ends of the second and fourth midway exhaust passages connect at a second midway joint, and first and second downstream exhaust passages extend from the first and second midway joints, respectively.

In one such embodiment, the engine combustion chambers are arranged generally in a V formation, and the exhaust manifold is arranged generally in a valley of the V. In another such embodiment, the engine combustion chambers are arranged generally in a V formation, and the exhaust manifold is arranged generally on opposing outer sides of the V.

BRIEF DESCRIPTION OF THE DRAWINGS

FIG. 1 is a schematic diagram generally illustrating an engine exhaust system having features of an embodiment.

FIG. 2 is a side view of an outboard motor attached to a rear part of a watercraft in accordance with an embodiment.

FIG. 3 is a side view of an engine configured according to an embodiment.

FIG. 4 is a rear view of the engine of FIG. 3.

FIG. 5 is a partial cross-sectional view of the bottom of the engine of FIG. 3.

FIG. 6 is an enlarged detailed cross-sectional view of a portion of FIG. 5.

FIG. 7 is a perspective view of a portion of the exhaust device of FIGS. 3-5.

FIG. 8 is a plan cross-sectional view of regulating parts and regulating valves in accordance with one embodiment.

FIG. 9 is an engine configured in accordance with another embodiment.

FIG. 10 is a front view of the engine of FIG. 9.

FIG. 11 is a plan, partial cross-sectional view of the engine of FIG. 9.

FIG. 12 is an enlarged cross-sectional view of a portion of FIG. 9.

FIG. 13 is an engine configured in accordance with yet another embodiment.

FIG. 14 is a front view of the engine of FIG. 13.

FIG. 15 is a plan view of a portion of the engine of FIG. 13.

FIG. 16 is a partial cross-sectional view at the bottom of the engine of FIG. 13.

FIG. 17 is a perspective view of a portion of the exhaust device of FIG. 13.

FIG. 18 is an enlarged cross-sectional view of a portion of FIG. 15.

FIG. 19 is an enlarged cross-sectional view of another portion of FIG. 15.

DETAILED DESCRIPTION OF PREFERRED EMBODIMENTS

Embodiments are described herein that provide exhaust device of an eight-cylinder engine which can prevent mutual interference of exhausts from respective cylinders, thereby providing enhanced performance of the engine.

In some embodiments, the exhaust device of an eight-cylinder engine includes first to eighth cylinders and an exhaust manifold extending from the first to eighth cylinders. The first to eighth cylinders are ignited in that order. The exhaust manifold includes first to eighth upstream exhaust pipes extending respectively from the first to eighth cylinders; first to fourth midway exhaust pipes extending respectively from a joint of extended, or downstream, ends of the first and fifth upstream exhaust pipes, a joint of extended ends of the second and sixth upstream exhaust pipes, a joint of extended ends of the third and seventh upstream exhaust pipes, and a joint of extended ends of the fourth and eighth upstream exhaust pipes; and first and second downstream exhaust pipes extending respectively from a joint of extended ends of the first and third midway exhaust pipes and a joint of extended ends of the second and fourth midway exhaust pipes for communicating the respective joints to the ambient atmosphere.

With reference to FIGS. 1 to 8 of the attached drawings, an embodiment of an outboard motor having inventive aspects is illustrated.

Referring to FIG. 2, a small watercraft 1 is designed to float on the surface of water 2 such as the sea. The arrow Fr indicates the forward direction in which the watercraft 1 is driven. The term "left and right" used herein refers to the width direction of the watercraft 1 with respect to the above forward direction.

The illustrated watercraft 1 includes a hull 3 designed to float on the surface of the water 2, and an outboard motor 4 supported at the stern of the hull 3. The illustrated outboard motor 4 includes an outboard motor body 5 for producing propulsive force to selectively drive the hull 3 forward or rearward, and a bracket 6 for supporting the outboard motor body 5 on the hull 3.

The outboard motor body 5 includes a case 9, a propeller 10, an engine 11, a power transmission apparatus 12 and a cowling 13. The case 9 extends vertically, and is supported on the hull 3 by the bracket 6. A lower portion of the case 9 is designed to be at least partially mounted in the water 2. The propeller 10 is supported at the lower end of the case 9. The engine 11 is supported at the upper end of the case 9. The power transmission apparatus 12 is enclosed in the case 9, and operatively connects the propeller 10 to the engine 11. The cowling 13 selectively covers and uncovers the engine 11 on the outside thereof.

The illustrated power transmission apparatus 12 includes a gear switching device 14 for selectively setting the propeller 10 to a forward drive mode or a reverse drive mode through user's manual operation. The operation of the switching device 14 allows the hull 3 to be selectively driven either forward or rearward.

Referring to FIGS. 1 to 6, the illustrated engine 11 is a four-stroke, V-type, eight-cylinder engine, and is used as a drive source for the outboard motor 4. The engine 11 includes an engine body 15, an intake device 17 and an exhaust device 19. The engine body 15 preferably is supported on the top of the case 9. The intake device 17 supplies a mixture of ambient air 16 and fuel to the engine body 15. The exhaust device 19 discharges burnt gas resulting from combustion of the mixture in the engine body 15 to the outside of the engine 11 as exhaust 18.

The illustrated engine body 15 includes a crankcase 23 and left and right banks 24 and 25 of cylinders. The crankcase 23 is supported on the top of the case 9, and supports a crankshaft 22 for rotation about a vertical axis 21. The left and right banks 24 and 25 project horizontally to the outside, or rearward and toward the sides, from the crankcase 23 in a V-configuration as viewed in the bottom view of the engine 11 (FIG. 5). The angle made by the illustrated banks 24, 25, specifically by first to eighth cylinders 27A to 27H, is approximately 60°. The first to eighth cylinders 27A to 27H are ignited sequentially in that order.

More specifically, in the illustrated embodiment one (left) bank 24 of the banks 24, 25 is formed by the first, fourth, sixth and seventh cylinders 27A, 27D, 27F and 27G. The cylinders 27A, 27D, 27F, 27G are arranged in the downward direction in that order. The other (right) bank 25 is formed by the eighth, third, fifth and second cylinders 27H, 27C, 27E and 27B. The cylinders 27H, 27C, 27E, 27B are arranged in the downward direction in that order. The first to eighth cylinders 27A to 27H are arranged in the downward direction in order of the first cylinder 27A, the eighth cylinder 27H, the fourth cylinder 27D, the third cylinder 27C, the sixth cylinder 27F, the fifth cylinder 27E, the seventh cylinder 27G and the second cylinder 27B.

The crankshaft 22 includes a crank main shaft 30, crank arms 31 and crankpins 32. The crank main shaft 30 is positioned about the axis 21, and has journals supported by the crankcase 23. The crank arms 31 project from the crank main shaft 30. The crankpins 32 are supported by the respective crank arms 31, and associated respectively with the first to eighth cylinders 27A to 27H. The angle made by the banks 24, 25 is approximately 60° as described above. The eight crankpins 32 associated with the first to eighth cylinders 27A to 27H are arranged in the following manner, as viewed in the bottom view of the engine 11 (FIG. 5).

More specifically, the crankpins 32 associated with the first, eighth, fourth, third, seventh, second, sixth and fifth cylinders are arranged in that order in the counterclockwise direction of the crankshaft 22. The angle made by the crankpins 32 associated with each pair of the first and eighth cylinders, the fourth and third cylinders, the seventh and second cylinders, and the sixth and fifth cylinders is 30°. The angle made by the crankpins 32 associated with each pair of the eighth and fourth cylinders, the third and seventh cylinders, the second and sixth cylinders, and the fifth and first cylinders is 60°. That is, the crankshaft 22 is of similar type to that of so-called cross plane/double plane/dual plane crank type of a V-type, multicylinder engine having a bank angle of 90°.

Each of the first to eighth cylinders 27A to 27H includes a piston 35 and a connecting rod 36. The piston 35 is fitted in a cylinder bore 34 of each cylinder in a manner sliding axially therealong. The connecting rod 36 operatively connects the piston 35 and the crankpin 32 of the crankshaft 22.

Each cylinder 27 has intake and exhaust ports 38 and 39 for communicating the inside and the outside of the cylinder bore 34. Intake and exhaust valves 40 and 41 are provided for selectively opening and closing the intake and exhaust ports 38 and 39, respectively. The intake and exhaust valves 40 and 41 are selectively opened and closed in response to a certain crank angle (θ) by a valve device (not shown) operatively connected to the crankshaft 22.

The intake device 17 includes intake pipes 44 extending from the respective cylinders 27, and throttle valves 45 attached to the extended ends of the intake pipes 44. Each intake pipe 44 has an intake passage 46 defined therein which communicates the ambient atmosphere to the intake port 38 through the throttle valve 45. The throttle valve 45 adjusts the opening of the intake passage 46 at the extended end of the intake pipe 44.

Continuing with reference to FIGS. 1 to 8, the illustrated exhaust device 19 includes an exhaust manifold 47 extending from the cylinders 27. The exhaust manifold 47 has an exhaust passage 48 defined therein which communicates the exhaust ports 39 to the ambient atmosphere.

The illustrated exhaust manifold 47 includes first to eighth upstream exhaust pipes 49A to 49H and first to fourth midway exhaust pipes 50A to 50D. The first to eighth upstream exhaust pipes 49A to 49H extend individually from the first to eighth cylinders 27A to 27H, respectively. The first to fourth midway exhaust pipes 50A to 50D extend respectively from a joint of the extended ends of the first and fifth upstream exhaust pipes 49A and 49E, a joint of the extended ends of the second and sixth upstream exhaust pipes 49B and 49F, a joint of the extended ends of the third and seventh upstream exhaust pipes 49C and 49G, and a joint of the extended ends of the fourth and eighth upstream exhaust pipes 49D and 49H.

The exhaust manifold 47 further includes first and second downstream exhaust pipes 51A and 51B. The first and second downstream exhaust pipes 51A and 51B extend respectively from a joint of the extended ends of the first and third midway exhaust pipes 50A and 50C and a joint of the extended ends of the second and fourth midway exhaust pipes 50B and 50D, and communicate the respective joints to the ambient atmosphere. It should be noted that "to the ambient atmosphere" described above refers to both directly to the ambient atmosphere and indirectly to the ambient atmosphere through the water 2.

Each matching pair of the upstream pipes, specifically the first and fifth upstream exhaust pipes 49A and 49E, the second and sixth upstream exhaust pipes 49B and 49F, the third and seventh upstream exhaust pipes 49C and 49G, and the fourth and eighth upstream exhaust pipes 49D and 49H, have approximately the same equivalent length.

Of the first to fourth midway exhaust pipes 50A to 50D, the first and fourth midway exhaust pipes 50A and 50D have approximately the same equivalent length. The second and third midway exhaust pipes 50B and 50C have approximately the same equivalent length. The first and fourth midway exhaust pipes 50A and 50D and the second and third midway exhaust pipes 50B and 50C, however, do not have the same equivalent length.

Each exhaust port 39 preferably has the shape of a lover's nozzle. Specifically, the exhaust port 39 has the cross sectional area increasing as it extends to the downstream side. As a result, during the start of the valve opening motion of the exhaust valve 41, exhaust 18 flowing from the cylinder bore 34 to the exhaust port 39 will be accelerated to Mach 1 or higher to thereby cause a shock wave.

The exhaust passage 48 of each upstream exhaust pipe 49 preferably has a diffuser structure. Specifically, the exhaust passage 48 has the cross sectional area increasing as it extends to the downstream side. The length of the upstream exhaust pipe 49 and the midway exhaust pipe 50 is set to be long enough such that the distance from the end face of the exhaust valve 41 on the cylinder bore 34 side to the downstream end of the midway exhaust pipe 50 is about 300 mm or larger.

More specifically, the upstream exhaust pipe 49 has a diffuser structure, and in addition, the upstream exhaust pipe 49 and the midway exhaust pipe 50 are relatively long. As a result, the shock wave generated in the exhaust port 39, and a portion passed over the exhaust port 39 can form a dilatational wave more efficiently. That is, the negative pressure of exhaust pulses in the exhaust port 39, the upstream exhaust pipe 49 and the midway exhaust pipe 50 can be increased to a sufficient level.

Each of the downstream exhaust pipes 51A, 51B has an expansion chamber case 56 forming the upstream side thereof and connected to the downstream ends of the midway exhaust pipes 50. The expansion chamber case 56 serves as a surge tank. The downstream sides of the downstream exhaust pipes 51A, 51B preferably are formed by the case 9 described above. More specifically, on the downstream sides of the downstream exhaust pipes 51A, 51B, second exhaust passages 48 extend from the upper end face of the case 9 to the back of a lower part thereof below the surface of the water 2 through the space within the case 9. The lower end of the expansion chamber case 56 is connected to the upper end face of the case 9. The lower end of the first exhaust passage 48 in the expansion chamber case 56 communicates with the upper end of the second exhaust passage 48 formed in the case 9.

As seen axially along the downstream ends of the midway exhaust pipes 50 (FIG. 5), in the vicinity of the downstream ends of the midway exhaust pipes 50, the expansion chamber case 56 has a cross sectional area about twice as large as or larger than twice the total cross sectional area of the downstream ends of the midway exhaust pipes 50. This provides effective damping of vibration caused by the pressure of the exhausts 18 flowing from the midway exhaust pipes 50 into the expansion chamber case 56, so that mutual interference of the exhausts 18 is prevented.

The inner bottom 56a of the expansion chamber case 56 preferably is inclined downward to the upstream end of the second exhaust passage 48 formed in the case 9. As a result, water 2 that may otherwise be trapped in a bottom part in the expansion chamber case 56 will flow through the second exhaust passage 48 in the case 9 to be drained.

An idling exhaust passage 57 is formed in the case 9 (FIG. 2) for communicating longitudinal midway parts of the first exhaust passage 48 in the downstream exhaust pipes 51 and the midway exhaust pipes 50 to the ambient atmosphere above the surface of the water 2.

In the illustrated embodiment, the upstream exhaust pipes 49, the midway exhaust pipes 50 and the expansion chamber cases 56 of the downstream exhaust pipes 51 of the exhaust manifold 47, and the case 9 individually have water jackets 58. The water jackets 58 prevent the temperature of the exhaust manifold 47 from increasing due to the exhausts 18.

Referring specifically to FIGS. 1 and 6, each cylinder 27 in the illustrated embodiment is provided with a first air passage 65 and a lead valve 66 so that first secondary air 63 is supplied to the upstream side of the exhaust port 39. Referring next to FIGS. 1 and 4, second air passages 67 and lead valves are provided so that second secondary air 64 is supplied to the first exhaust passage 48 in the midway exhaust pipes 50.

First $O_2$ sensors 72 and second $O_2$ sensors 73 are provided. The first $O_2$ sensor 72 is disposed downstream of the first and second secondary airs 63, 64, and detects the components (concentration of oxygen) of the exhaust 18 flowing through the midway exhaust pipe 50. The second $O_2$ sensor 73 is also disposed downstream of the first and second secondary airs 63, 64, and detects the components of the exhaust 18 flowing through the downstream end of the expansion chamber case 56. A cover 74 preferably is provided for covering the second $O_2$ sensor 73 from above. As a result, water droplets are prevented from falling onto the $O_2$ sensor 73. Accordingly, the $O_2$ sensor is prevented from being damaged due to water droplets.

Based on the detection signals from the $O_2$ sensors 72, 73, the opening of the intake passage 46 adjusted by the throttle valve 45, the fuel supply amount, and the supply amount of secondary airs 63, 64 are controlled automatically. Due to such control, enhanced purification of the exhaust 18 is provided.

When the engine 11 is driven, the crankshaft 22 makes rotation (R), and the first to eighth cylinders 27A to 27H are ignited sequentially in that order. The ignitions can be performed at predetermined intervals of crank angle (θ), preferably at a 90°. It is understood, however, that the ignitions may not be performed at predetermined intervals but a plurality of (two) cylinders may be ignited almost simultaneously.

Exhausts 18 are discharged sequentially from the cylinders 27 through the exhaust manifold 47 in the same order as the cylinders 27 are ignited. When the engine 11 is in a normal operating state such as at full load, the pressure of the exhaust 18 is relatively high and the amount of the exhaust 18 is relatively large. Thus, most of the exhaust 18 is discharged through the first exhaust passage 48 of the exhaust manifold 47 to the ambient atmosphere through the water 2 against water pressure. A small amount of the rest of the exhaust 18 is discharged directly to the ambient atmosphere through the idling exhaust passage 57. The rotation (R) of the crankshaft 22 by the operation of the engine drives the propeller 10 via the power transmission apparatus 12 to thereby drive the watercraft 1.

When the engine 11 is of idle, the pressure of the exhaust 18 is relatively low and the amount of the exhaust is relatively small. Thus, due to water pressure, the exhaust 18 is prevented from being discharged into the water 2 through the exhaust passage 48 of the exhaust manifold 47, and thus most of the exhaust 18 is discharged to the ambient atmosphere through the idling exhaust passage 57.

Referring to FIGS. 1, 4 and 8, regulating parts 78 preferably are formed at the downstream ends of the respective midway exhaust pipes 50, or midway parts of the first exhaust passage 48. The opening of the regulating parts 78 is made variable by a plurality of (four) butterfly regulating valves 79 individually provided at the downstream ends of the midway exhaust pipes 50. The regulating valves 79 preferably are operatively connected to each other to selectively open and close together. An actuator (not shown) is provided for moving the regulating valves. It is understood that, in other embodiments, the regulating valves 79 may be moved individually.

With the above structure, the exhaust manifold 47 includes the first to eighth upstream exhaust pipes 49A to 49H extending respectively from the first to eighth cylinders 27A to 27H; the first to fourth midway exhaust pipes 50A to 50D extending respectively from a joint of the extended ends of the first and fifth upstream exhaust pipes 49A and 49E, a joint of the extended ends of the second and sixth upstream exhaust pipes 49B and 49F, a joint of the extended ends of the third and seventh upstream exhaust pipes 49C and 49G, and a joint of the extended ends of the fourth and eighth upstream exhaust pipes 49D and 49H; and the first and second downstream exhaust pipes 51A and 51B extending respectively from a joint of the extended ends of the first and third midway exhaust pipes 50A and 50C and a joint of the extended ends of the second and fourth midway exhaust pipes 50B and 50D for communicating the respective joints to the ambient atmosphere.

As a result, an exhaust 18 from the first cylinder 27A, for example, flows sequentially through the first upstream exhaust pipe 49A, the first midway exhaust pipe 50A and the first downstream exhaust pipe 51A to the ambient atmosphere. Next, an exhaust 18 from the second cylinder 27B flows sequentially through the second upstream exhaust pipe 49B, the second midway exhaust pipe 50B and the second downstream exhaust pipe 51B to the ambient atmosphere. Next, an exhaust 18 is discharged from the third cylinder 27C. This exhaust 18 will be discussed in greater detail below. Next, an exhaust 18 from the fourth cylinder 27D flows sequentially through the fourth upstream exhaust pipe 49D, the fourth midway exhaust pipe 50D and the second downstream exhaust pipe 51B to the ambient atmosphere. Thus, the subsequent exhausts 18 discharged from the second cylinder 27B and the fourth cylinder 27D are prevented from interfering with the exhaust 18 from the first cylinder 27A in the upstream exhaust pipes 49, the midway exhaust pipes 50 and the downstream exhaust pipes 51.

The exhaust 18 from the third cylinder 27C described above flows sequentially through the third upstream exhaust pipe 49C, the third midway exhaust pipe 50C and the first downstream exhaust pipe 51A to the ambient atmosphere. Thus, both the exhaust 18 from the first cylinder 27A and the exhaust 18 from the third cylinder 27C flow through the first downstream exhaust pipe 51A. Accordingly, the exhaust 18 from the third cylinder 27C may interfere with the exhaust 18 from the first cylinder 27A in the first downstream exhaust pipe 51A.

Advantageously, the first upstream exhaust pipe 49A and the first midway exhaust pipe 50A, through which the exhaust 18 from the first cylinder 27A flows, and the third upstream exhaust pipe 49C and the third midway exhaust pipe 50C, through which the exhaust 18 from the third cylinder 27C flows, are separate from each other and have a relatively long length. For this reason, the first and third cylinders 27A and 27C are far away from each other because of the first exhaust passage 48. Thus, the exhaust 18 from the third cylinder 27C is prevented from interfering with the exhaust 18 from the first cylinder 27A in the first downstream exhaust pipe 51A.

The first cylinder 27A and the fifth cylinder 27E are positioned in proximity to each other because the first and fifth upstream exhaust pipes 49A and 49E, extending from the first cylinder 27A and the fifth cylinder 27E, are joined to each other. However, the ignition interval between the first cylinder 27A and the fifth cylinder 27E is significantly long due to ignitions of the second to fourth cylinders 27B to 27D occurring therebetween. As a result, overlapping of the exhaust periods of the first cylinder 27A and the fifth cylinder 27E is prevented. Thus, the exhaust 18 from the fifth cylinder 27E is prevented from interfering with the exhaust 18 from the first cylinder 27A in the first and fifth upstream exhaust pipes 49A and 49E.

The interval between ignition of the first cylinder 27A and ignitions of the sixth to eighth cylinders 27F to 27H is even longer. As a result, the exhausts 18 from the sixth to eighth cylinders 27F to 27H are prevented from interfering with the exhaust 18 from the first cylinder 27A.

The same description as made to the exhaust 18 from the first cylinder 27A is applied to the exhausts 18 from the other cylinders 27. As a result, interference of the exhausts in the engine 11 is prevented, and thus desired exhaust pulses having a sufficiently high negative pressure are obtained. Therefore, enhanced performance of the engine 11 is achieved.

As described above, each pair of the first and fifth upstream exhaust pipes 49A and 49E, the second and sixth upstream exhaust pipes 49B and 49F, the third and seventh upstream exhaust pipes 49C and 49G, and the fourth and eighth upstream exhaust pipes 49D and 49H have approximately the same equivalent length.

Of the exhausts 18 from the first to eighth cylinders 27A to 27H, the following are more likely to interfere with each other: the exhausts 18 from the first and fifth cylinders 27A and 27E in the first and fifth upstream exhaust pipes 49A and 49E joined to each other; the exhausts 18 from the second and sixth cylinders 27B and 27F in the second and sixth upstream exhaust pipes 49B and 49F; the exhausts 18 from the third and seventh cylinders 27C and 27G in the third and seventh upstream exhaust pipes 49C and 49G; and the exhausts 18 from the fourth and eighth cylinders 27D and 27H in the fourth and eighth upstream exhaust pipes 49D and 49H.

Therefore, as described above, the first and fifth upstream exhaust pipes 49A and 49E, for example, in which interference of exhausts is more likely to occur, have approximately the same equivalent length.

As a result, interference of an exhaust 18 from the first cylinder 27A with an exhaust 18 from the fifth cylinder 27E ignited fourth after the first cylinder 27A and interference of the exhaust 18 from the fifth cylinder 27E with an exhaust 18 from the first cylinder 27A ignited fourth after the fifth cylinder 27E can be set to about the same level. That is, interference between the exhausts 18 from the first and fifth cylinders 27A and 27E for example can be minimized and more balanced. This ensures the excellent and stable performance of the engine.

It is understood that the foregoing description is based on the illustrated example, and that in other embodiments the banks 24, 25 may be arranged in a laterally inverse form, in-line, or in other configurations. It is also understood that the second exhaust passages 48 formed in the case 9 may be one passage in other embodiments.

FIGS. 9 to 19 illustrate additional embodiments that have aspects in common with the embodiments discussed above. Therefore, parts corresponding to components in the above embodiment are identified with the same reference numerals in the drawings and their description is not repeated. Instead, their differences are mainly described below. It is to be understood that the configurations of the parts of the embodiments may be combined in various ways in light of the principles discussed herein.

With reference to FIGS. 9 to 12, another embodiment is described. In this embodiment, one (left) bank 24 of the banks 24, 25 is formed by the first, third, seventh and fifth cylinders 27A, 27C, 27G and 27E. The other (right) bank 25 is formed by the second, fourth, eighth and sixth cylinders 27B, 27D, 27H and 27F. In the illustrated embodiments, exhaust ports 39 on opposing sides of engine and intake device 17 on Valey of V.

In the illustrated embodiment, the first, third, seventh and fifth upstream exhaust pipes 49A, 49C, 49G and 49E, the first and third midway exhaust pipes 50A and 50C, and the first downstream exhaust pipe 51A, which are associated with the first, third, seventh and fifth cylinders 27A, 27C, 27G and 27E, are arranged to the left of the crankshaft 22. The other exhaust pipes associated with the second, fourth, eighth and sixth cylinders 27B, 27D, 27H and 27F are arranged to the right of the crankshaft 22.

The first exhaust passage 48 of each midway exhaust pipe 50 preferably has a plurality of (two) catalysts 60, 61 disposed therein longitudinally. In one embodiment, the catalysts 60, 61 are three-way catalysts for purifying exhaust 18. The catalysts 60, 61 preferably have a longitudinal length longer than a radial length in the exhaust passage 48.

Of the first and second secondary airs 63, 64, the second secondary air 64 supplied to the downstream side of the first exhaust passage 48 preferably is supplied to a part of the first exhaust passage 48 between the catalysts 60, 61 via the second air passage 67 and the lead valve 68. Both the $O_2$ sensors 72, 73 are disposed downstream of the catalysts 60, 61.

With the above structure, the catalysts 60, 61 for purifying exhaust are disposed in the first exhaust passage 48 in the exhaust manifold 47. The first air passage 65 is formed for supplying first secondary air 63 to the upstream side of the catalysts 60, 61 in the first exhaust passage 48.

As described above, since exhaust pulses having a sufficiently high negative pressure are obtained, first and second secondary airs 63 and 64 can be sucked more smoothly into the exhaust passage 48 due to the negative pressure. That is, a larger amount of first and second secondary airs 63, 64 can be supplied into the exhaust passage 48. Thus, even when the air-fuel ratio (A/F) of the mixture to be supplied to the engine body 15 of the engine 11 by the intake device 17 is small (rich), the exhaust air-fuel ratio on the upstream side of the catalysts 60, 61 can be set to a desired value such as a theoretical air-fuel ratio. More reliable purification of exhaust 18 is thereby achieved. As a result of such purification of exhaust 18, enhanced performance of the engine 11 is achieved more reliably.

As described above, the catalysts 60, 61 have a longitudinal length longer than a radial length in the exhaust passage 48.

In this embodiment, the above engine 11 is incorporated in the outboard motor 4. Compared to the case where the engine 11 is incorporated in a commercially available automobile, the engine 11 is often operated at a maximum output point under full load. As a result, the flow speed of exhaust 18 in the exhaust passage 48 becomes relatively high. Thus, in this embodiment, the catalysts 60, 61 have a longer length as described above. This ensures that the exhaust 18 is exposed to the catalysts 60, 61 more sufficiently. As a result, more reliable purification of the exhaust 18 is achieved.

It is understood that in other embodiments the midway exhaust passages 50 may be shorter in length as indicated by chain double-dashed lines in FIG. 9.

In order to explain the present invention in more detail, a third embodiment of the present invention will be described below. With reference next to FIGS. 13 to 19, another embodiment is provided having generally similar structure as that of the embodiments of FIGS. 1-8 except that generally the entire exhaust device 19 is arranged in front of the engine body 15. Also, balancers 82 operatively connected to the crankshaft 22 are provided The idling exhaust passage 57 is formed for communicating longitudinal "midway parts" of the first exhaust passage 48 in the midway exhaust pipes 50 to the ambient atmosphere above the surface of the water 2. The regulating part 78 having the regulating valve 79 to vary its opening is provided on the downstream side of and in proximity to the "midway part" of the first exhaust passage 48.

With the above structure, firstly, proper adjustment of the opening of the regulating part 78 according to the operating state of the engine 11 allows the pressure of the exhaust 18 flowing through the midway exhaust pipe 50 to be reversed by the regulating part 78, so that exhaust pulses having a desired negative pressure can be obtained at desired timing. Thus, the more enhanced performance of the engine 11 can be provided.

Secondly, the following operation and effect are obtained. When the hull 3 is driven rearward in response to the operation of the switching device 14 of the power transmission apparatus 12 in the outboard motor 4, the water 2 may flow back through the exhaust passage 48 of the downstream exhaust pipe 51 and enter the idling exhaust passage 57, due to the dynamic pressure of the water 2. In this case, since both the exhaust passages 48, 57 are obstructed, the engine 11 may lose speed or stop.

Thus, in response to the operation of the switching device 14 to drive the hull 3 rearward, if automatic control, manual operation or the like is performed to close the regulating valve 79 to decrease the opening of the regulating part 78, the entry of the water 2 into the idling exhaust passage 57 is prevented by the regulating part 78. Thus, the flow of exhaust 18 at least through the idling exhaust passage 57 is ensured. As a result, the engine 11 is prevented from losing speed or stopping due to backflow of the water 2 through the exhaust passage 48. Advantageously, the stable operation of the engine 11 can be continuously effected.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. For example, both the forward and reverse bevel gears can have the same oil passage structure, can have different ones of the structures discussed herein, or may have other structures consistent with the principles discussed herein. Thus, it is intended that the scope of the present invention herein disclosed should not be limited by the particular disclosed embodiments described above, but should be determined only by a fair reading of the claims that follow.

What is claimed is:

1. An exhaust device of an eight-cylinder engine, comprising first through eighth cylinders ignited in that order, each cylinder having an exhaust port, and an exhaust manifold communicating with the exhaust ports of the first to eighth cylinders, the exhaust manifold comprising first through eighth upstream exhaust pipes extending respectively from the exhaust ports of the first through eighth cylinders, first through fourth midway exhaust pipes extending respectively from a joint of downstream ends of the first and fifth upstream exhaust pipes, a joint of downstream ends of the second and sixth upstream exhaust pipes, a joint of downstream ends of the third and seventh exhaust pipes, and a joint of downstream ends of the fourth and eighth upstream exhaust pipes, and first and second downstream exhaust pipes extending respectively from a joint of downstream ends of the first and third midway exhaust pipes and a joint of downstream ends of the second and fourth midway exhaust pipes for communicating the respective joints to the ambient atmosphere.

2. The exhaust device according to claim 1, wherein each pair of the first and fifth upstream exhaust pipes, the second and sixth upstream exhaust pipes, the third and seventh upstream exhaust pipes, and the fourth and eighth upstream exhaust pipes have approximately the same equivalent length.

3. The exhaust device according to claim 2 additionally comprising a catalyst disposed in an exhaust passage in the exhaust manifold for purifying exhaust, and an air passage for supplying secondary air to the upstream side of the catalyst in the exhaust passage.

4. The exhaust device according to claim 3, wherein the catalyst has a longitudinal length longer than a radial length in the exhaust passage.

5. The exhaust device according to claim 4, wherein the engine is used as a drive source for an outboard motor, and further comprising an idling exhaust passage for communicating a midway part of the exhaust passage in the exhaust manifold to the ambient atmosphere above the surface of water, and a regulating part for varying the opening of a part of the exhaust passage on the downstream side of the midway part of the exhaust passage.

6. The exhaust device according to claim 1, further comprising a catalyst disposed in an exhaust passage in the exhaust manifold for purifying exhaust, and an air passage for supplying secondary air to the upstream side of the catalyst in the exhaust passage.

7. The exhaust device according to claim 6, wherein the engine is used as a drive source for an outboard motor, and further comprising an idling exhaust passage for communicating a midway part of the exhaust passage in the exhaust manifold to the ambient atmosphere above the surface of water, and a regulating part for varying the opening of a part of the exhaust passage on the downstream side of the midway part of the exhaust passage.

8. An outboard motor comprising a cowling generally enclosing an engine, the engine having first through eighth combustion chambers adapted to be ignited in that order, each combustion chamber having an exhaust port, the engine additionally comprising an exhaust manifold communicating with the exhaust ports, the exhaust manifold comprising first through eighth upstream exhaust passages each having an upstream end communicating with the exhaust ports of the first through eight combustion chambers, respectively, downstream ends of the first and fifth upstream passages connected at a first upstream joint, downstream ends of the second and sixth upstream passages connected at a second upstream joint, downstream ends of the third and seventh upstream passages connected at a third upstream joint, downstream ends of the fourth and eighth upstream passages connected at a fourth upstream joint, first through fourth midway exhaust passages extending respectively from the first through fourth upstream joints, respectively, downstream ends of the first and third midway exhaust passages connected at a first midway joint, downstream ends of the second and fourth midway exhaust passages connected at a second midway joint, and first and second downstream exhaust passages extending from the first and second midway joints, respectively.

9. An outboard motor as in claim 8, wherein each pair of the first and fifth upstream exhaust passages, the second and sixth upstream exhaust passages, the third and seventh upstream exhaust passages, and the fourth and eighth upstream exhaust passages have approximately the same equivalent length.

10. An outboard motor as in claim 9 additionally comprising a catalyst disposed in an exhaust passage in the exhaust manifold for purifying exhaust, and an air passage for supplying secondary air to the upstream side of the catalyst in the exhaust passage.

11. An outboard motor as in claim 10, wherein the catalyst has a longitudinal length longer than a radial length in the exhaust passage.

12. An outboard motor as in claim 11 additionally comprising an idling exhaust passage for communicating a part of the exhaust manifold to the ambient atmosphere above the surface of water, and a regulating part for varying the opening of the part of the exhaust manifold.

13. An outboard motor as in claim 9, wherein the engine and exhaust manifold is generally enclosed within a cowling of the motor.

14. An outboard motor as in claim 13, wherein the engine combustion chambers are arranged generally in a V formation, and the exhaust manifold is arranged generally in a valley of the V.

15. An outboard motor as in claim 13, wherein the engine combustion chambers are arranged generally in a V formation, and the exhaust manifold is arranged generally on opposing outer sides of the V.

16. An outboard motor as in claim 8 additionally comprising a catalyst disposed in an exhaust passage in the exhaust manifold for purifying exhaust, and an air passage for supplying secondary air to the upstream side of the catalyst is arranged in the exhaust passage.

* * * * *